(12) United States Patent
Barnes et al.

(10) Patent No.: US 7,905,399 B2
(45) Date of Patent: Mar. 15, 2011

(54) LINKING TRANSACTION CARDS WITH SPENDING ACCOUNTS

(76) Inventors: Brian T. Barnes, South Jordan, UT (US); Michael Bliman, Matawan, NJ (US); Sarah E. Harrison, New York, NY (US); Jason S. Jagatic, Hoboken, NJ (US); Dana J. Klaboe, Brooklyn, NY (US); Leigh Reynolds Malnati, Mountain Lakes, NJ (US)

(*) Notice: Subject to any disclaimer, the term of this patent is extended or adjusted under 35 U.S.C. 154(b) by 718 days.

(21) Appl. No.: 11/381,641

(22) Filed: May 4, 2006

(65) Prior Publication Data

US 2007/0175985 A1 Aug. 2, 2007

Related U.S. Application Data

(63) Continuation-in-part of application No. 10/904,639, filed on Nov. 19, 2004, now Pat. No. 7,213,750.

(60) Provisional application No. 60/697,514, filed on Jul. 8, 2005.

(51) Int. Cl.
*G06K 5/00* (2006.01)
(52) U.S. Cl. .......................... 235/381; 235/380
(58) Field of Classification Search ............ 235/375, 235/380, 381; 705/4, 39, 40, 2, 35, 30
See application file for complete search history.

(56) References Cited

U.S. PATENT DOCUMENTS

| | | |
|---|---|---|
| 4,491,725 A | 1/1985 | Pritchard |
| 4,713,761 A | 12/1987 | Sharpe et al. |
| 4,858,121 A | 8/1989 | Barber et al. |
| 4,916,611 A | 4/1990 | Doyle et al. |
| 5,235,507 A | 8/1993 | Sackler et al. |
| 5,301,105 A | 4/1994 | Cummings, Jr. |
| 5,532,464 A | 7/1996 | Josephson et al. |
| 5,550,734 A | 8/1996 | Tarter et al. |
| 5,583,760 A | 12/1996 | Klesse |
| 5,704,044 A | 12/1997 | Tarter et al. |
| 5,740,425 A | 4/1998 | Povilus |
| 5,826,243 A | 10/1998 | Musmanno et al. |
| 5,832,447 A | 11/1998 | Rieker et al. |
| 5,857,079 A | 1/1999 | Claus et al. |
| 5,873,069 A | 2/1999 | Reuhl et al. |
| 5,878,141 A | 3/1999 | Daly et al. |
| 5,903,830 A | 5/1999 | Joao et al. |
| 5,930,759 A | 7/1999 | Moore et al. |
| 5,945,653 A | 8/1999 | Walker et al. |

(Continued)

OTHER PUBLICATIONS

Alonso, G. et al., "Enhancing the Fault Tolerance of Workflow Management Systems," *IEEE Concurrency*, pp. 74-81 (Jul. - Sep. 2000).

(Continued)

*Primary Examiner* — Thien M Le
(74) *Attorney, Agent, or Firm* — Sterne, Kessler, Goldstein & Fox P.L.L.C.

(57) ABSTRACT

A computer-implemented system and method to facilitate a purchase utilizing a flexible spending account, comprising the steps of: receiving, at a host computer, a request for payment authorization for an item; determining whether the item qualifies for pre-tax treatment; and when the item qualifies for pre-tax treatment: determining at least partial payment authorization for the item, transmitting the at least partial payment authorization for the item to a point of sale device; causing the flexible spending account to be debited for at least a portion of the purchasing amount of the item based on the payment authorization; and debiting a non-flexible spending account for an item not qualifying for pre-tax treatment.

20 Claims, 7 Drawing Sheets

U.S. PATENT DOCUMENTS

| | | | |
|---|---|---|---|
| 6,012,035 A | 1/2000 | Freeman, Jr. et al. | |
| 6,042,005 A | 3/2000 | Basile et al. | |
| 6,108,641 A | 8/2000 | Kenna et al. | |
| 6,112,986 A | 9/2000 | Berger et al. | |
| 6,154,732 A | 11/2000 | Tarbox | |
| 6,208,973 B1 | 3/2001 | Boyer et al. | |
| 6,249,772 B1 | 6/2001 | Walker et al. | |
| 6,292,786 B1 | 9/2001 | Deaton et al. | |
| 6,339,766 B1 | 1/2002 | Gephart | |
| 6,341,265 B1 | 1/2002 | Provost et al. | |
| 6,343,271 B1 | 1/2002 | Peterson et al. | |
| 6,343,279 B1 | 1/2002 | Bissonette et al. | |
| 6,353,811 B1 | 3/2002 | Weissman | |
| 6,386,450 B1 | 5/2002 | Ogasawara | |
| 6,394,341 B1 | 5/2002 | Mäkipää et al. | |
| 6,418,441 B1 | 7/2002 | Call | |
| 6,422,462 B1 | 7/2002 | Cohen | |
| 6,442,526 B1 | 8/2002 | Vance et al. | |
| 6,442,532 B1 | 8/2002 | Kawan | |
| 6,488,205 B1 | 12/2002 | Jacobson | |
| 6,543,683 B2 | 4/2003 | Hoffman | |
| 6,594,640 B1 | 7/2003 | Postrel | |
| 6,601,761 B1 | 8/2003 | Katis | |
| 6,615,190 B1 | 9/2003 | Slater | |
| 6,637,649 B2 | 10/2003 | Walsh | |
| 6,662,999 B1 | 12/2003 | Vancour et al. | |
| 6,671,358 B1 | 12/2003 | Seidman et al. | |
| 6,749,114 B2 | 6/2004 | Madani | |
| 6,776,332 B2 | 8/2004 | Allen et al. | |
| 6,820,058 B2 | 11/2004 | Wood et al. | |
| 6,820,059 B2 | 11/2004 | Wood et al. | |
| 6,879,959 B1 | 4/2005 | Chapman et al. | |
| 6,898,598 B2 | 5/2005 | Himmel et al. | |
| 6,932,268 B1 | 8/2005 | McCoy et al. | |
| 6,947,900 B2 | 9/2005 | Giordano, III et al. | |
| 6,999,943 B1 | 2/2006 | Johnson et al. | |
| 7,039,593 B2 | 5/2006 | Sager | |
| 7,072,842 B2 | 7/2006 | Provost et al. | |
| 7,097,098 B2 | 8/2006 | Roberts | |
| 7,104,443 B1 | 9/2006 | Paul et al. | |
| 7,133,840 B1 | 11/2006 | Kenna et al. | |
| 7,158,955 B2 | 1/2007 | Diveley et al. | |
| 7,174,302 B2 | 2/2007 | Patricelli et al. | |
| 7,197,468 B1 * | 3/2007 | Patricelli et al. | 705/4 |
| 7,213,750 B1 | 5/2007 | Barnes et al. | |
| 7,233,942 B2 | 6/2007 | Nye | |
| 7,249,097 B2 | 7/2007 | Hutchison et al. | |
| 7,249,112 B2 | 7/2007 | Berardi et al. | |
| 7,263,493 B1 | 8/2007 | Provost et al. | |
| 7,268,667 B2 | 9/2007 | Beenau et al. | |
| 7,268,668 B2 | 9/2007 | Beenau et al. | |
| 7,333,937 B2 | 2/2008 | Baldwin, Jr. et al. | |
| 7,346,522 B1 | 3/2008 | Baylor et al. | |
| 7,380,707 B1 | 6/2008 | Fredman | |
| 7,392,224 B1 | 6/2008 | Bauer et al. | |
| 7,434,729 B2 | 10/2008 | Cracchiolo et al. | |
| 7,493,266 B2 | 2/2009 | Gupta | |
| 7,499,875 B1 | 3/2009 | May et al. | |
| 7,566,000 B2 | 7/2009 | Agostino et al. | |
| 7,624,026 B2 | 11/2009 | DiPiero et al. | |
| 7,650,308 B2 | 1/2010 | Nguyen et al. | |
| 2001/0014873 A1 | 8/2001 | Henderson et al. | |
| 2001/0034618 A1 | 10/2001 | Kessler et al. | |
| 2002/0016764 A1 | 2/2002 | Hoffman | |
| 2002/0019885 A1 | 2/2002 | Sleeper | |
| 2002/0035529 A1 | 3/2002 | Tooke | |
| 2002/0087444 A1 | 7/2002 | DiPiero et al. | |
| 2002/0099659 A1 | 7/2002 | Swentor | |
| 2002/0116206 A1 | 8/2002 | Chatani | |
| 2002/0128879 A1 | 9/2002 | Spears | |
| 2002/0147678 A1 * | 10/2002 | Drunsic | 705/39 |
| 2002/0174030 A1 | 11/2002 | Praisner et al. | |
| 2002/0198831 A1 | 12/2002 | Patricelli et al. | |
| 2002/0198833 A1 | 12/2002 | Wohlstadter | |
| 2003/0018567 A1 | 1/2003 | Flitcroft et al. | |
| 2003/0023498 A1 | 1/2003 | Benton | |
| 2003/0023549 A1 | 1/2003 | Armes et al. | |
| 2003/0033272 A1 | 2/2003 | Himmel et al. | |
| 2003/0061153 A1 | 3/2003 | Birdsong et al. | |
| 2003/0061358 A1 | 3/2003 | Piazza et al. | |
| 2003/0065561 A1 | 4/2003 | Brown et al. | |
| 2003/0069760 A1 | 4/2003 | Gelber | |
| 2003/0088487 A1 | 5/2003 | Cheng et al. | |
| 2003/0097331 A1 | 5/2003 | Cohen | |
| 2003/0119554 A1 | 6/2003 | Horn | |
| 2003/0126094 A1 | 7/2003 | Fisher et al. | |
| 2003/0130948 A1 | 7/2003 | Algiene et al. | |
| 2003/0135459 A1 | 7/2003 | Abelman et al. | |
| 2003/0187695 A1 | 10/2003 | Drennan | |
| 2003/0195769 A1 | 10/2003 | Francis | |
| 2003/0195773 A1 | 10/2003 | Mahaffey | |
| 2003/0200118 A1 | 10/2003 | Lee et al. | |
| 2003/0216997 A1 | 11/2003 | Cohen | |
| 2003/0225678 A1 | 12/2003 | Understein | |
| 2004/0010449 A1 | 1/2004 | Berardi et al. | |
| 2004/0010462 A1 | 1/2004 | Moon et al. | |
| 2004/0049425 A1 | 3/2004 | Bakker et al. | |
| 2004/0083183 A1 | 4/2004 | Hardesty et al. | |
| 2004/0098328 A1 | 5/2004 | Grant et al. | |
| 2004/0098351 A1 | 5/2004 | Duke | |
| 2004/0117302 A1 | 6/2004 | Weichert et al. | |
| 2004/0138999 A1 | 7/2004 | Friedman et al. | |
| 2004/0238622 A1 | 12/2004 | Freiberg | |
| 2004/0243464 A1 | 12/2004 | Beck | |
| 2004/0249745 A1 | 12/2004 | Baaren | |
| 2005/0015280 A1 * | 1/2005 | Gabel et al. | 705/2 |
| 2005/0027607 A1 | 2/2005 | Pearson | |
| 2005/0033677 A1 | 2/2005 | Birdsong et al. | |
| 2005/0038740 A1 | 2/2005 | Ogilvie | |
| 2005/0043992 A1 | 2/2005 | Cohagan et al. | |
| 2005/0065873 A1 | 3/2005 | Hendrickson et al. | |
| 2005/0075931 A1 | 4/2005 | Pearson | |
| 2005/0080692 A1 | 4/2005 | Padam et al. | |
| 2005/0098621 A1 | 5/2005 | de Sylva | |
| 2005/0102181 A1 | 5/2005 | Scroggie et al. | |
| 2005/0144071 A1 | 6/2005 | Monahan et al. | |
| 2005/0144074 A1 | 6/2005 | Fredregill et al. | |
| 2005/0256794 A1 | 11/2005 | Colby | |
| 2005/0261968 A1 * | 11/2005 | Randall et al. | 705/16 |
| 2005/0288964 A1 | 12/2005 | Lutzen et al. | |
| 2006/0027647 A1 | 2/2006 | Deane et al. | |
| 2006/0036523 A1 * | 2/2006 | Stover et al. | 705/35 |
| 2006/0064332 A1 | 3/2006 | Schoenbaum et al. | |
| 2006/0076400 A1 | 4/2006 | Fletcher | |
| 2006/0080144 A1 * | 4/2006 | Goel et al. | 705/2 |
| 2006/0085335 A1 | 4/2006 | Crawford et al. | |
| 2006/0113376 A1 | 6/2006 | Reed et al. | |
| 2006/0143052 A1 | 6/2006 | Fotsch et al. | |
| 2006/0149595 A1 | 7/2006 | Williams et al. | |
| 2006/0149670 A1 | 7/2006 | Nguyen et al. | |
| 2006/0167720 A1 | 7/2006 | Harrison et al. | |
| 2006/0173777 A1 | 8/2006 | Torres et al. | |
| 2006/0253324 A1 | 11/2006 | Miller | |
| 2006/0277075 A1 | 12/2006 | Salwan | |
| 2006/0287914 A1 | 12/2006 | Shelley | |
| 2007/0007335 A1 | 1/2007 | Cracchiolo et al. | |
| 2007/0011025 A1 | 1/2007 | Cracchiolo et al. | |
| 2007/0011088 A1 | 1/2007 | Cracchiolo et al. | |
| 2007/0011089 A1 | 1/2007 | DeSchryver | |
| 2007/0023504 A1 | 2/2007 | Blankenship et al. | |
| 2007/0033070 A1 | 2/2007 | Beck et al. | |
| 2007/0106607 A1 | 5/2007 | Seib et al. | |
| 2007/0119920 A1 | 5/2007 | Hogg et al. | |
| 2007/0168279 A1 | 7/2007 | D'Angelo | |
| 2007/0179813 A1 | 8/2007 | Darling | |
| 2007/0185799 A1 | 8/2007 | Harrison et al. | |
| 2007/0185800 A1 | 8/2007 | Harrison et al. | |
| 2007/0185801 A1 | 8/2007 | Harrison et al. | |
| 2007/0185802 A1 | 8/2007 | Harrison et al. | |
| 2007/0185803 A1 | 8/2007 | Harrison et al. | |
| 2007/0194108 A1 | 8/2007 | Kalappa et al. | |
| 2007/0194109 A1 | 8/2007 | Harrison et al. | |
| 2007/0203757 A1 | 8/2007 | Dibiasi et al. | |
| 2007/0265961 A1 | 11/2007 | Shah et al. | |
| 2008/0011820 A1 * | 1/2008 | Brown et al. | 235/375 |
| 2008/0110971 A1 * | 5/2008 | Pover et al. | 235/375 |
| 2008/0156868 A1 * | 7/2008 | Slen et al. | 235/380 |

| | | | |
|---|---|---|---|
| 2008/0179395 A1* | 7/2008 | Dixon et al. | 235/380 |
| 2008/0195423 A1 | 8/2008 | Baylor et al. | |
| 2008/0210751 A1 | 9/2008 | Kim | |

OTHER PUBLICATIONS

Chan et al., U.S. Appl. No. 11/674,437, filed Feb. 13, 2007, entitled "Methods, Systems, and Computer Program Products for Promoting Healthcare Information Technologies to Card Members".
Haase et al., U.S. Appl. No. 11/770,367, filed Jun. 28, 2007, entitled "Universal Rollover Account".
Harrison et al., U.S. Appl. No. 11/698,955, filed Jan. 29, 2007, entitled "Filtered Healthcare Payment Card Linked to Tax-Advantaged Accounts".
Jagatic et al., U.S. Appl. No. 11/561,326, filed Dec. 17, 2006, entitled "Variable Revenue Sharing for Multiple Account Payment Instruments".
Jagatic et al., U.S. Appl. No. 11/675,478, filed Feb. 15, 2007, entitled "Transmission and Capture of Line-Item-Detail to Assist in Transaction Substantiation and Matching".
Keck et al., U.S. Appl. No. 11/675,438, filed Feb. 15, 2007, entitled "Practice Management System (PMS) Integration".
Keck et al., U.S. Appl. No. 11/675,456, filed Feb. 15, 2007, entitled "Practice Management System (PMS) Integration".
Keck et al., U.S. Appl. No. 11/768,708, filed Jun. 26, 2007, entitled "Accelerated Payments for Health Care Plans".
Schoenberg, "Internet Based Repository of Medical Records That Retains Patient Confidentiality," British Medical Journal, vol. 321, Issue 7270, pp. 1199-1203 (Nov. 11, 2000).
Richardson, P., "Online broker woos real estate agents; Amerihall's fees lower than those of brick-and-mortar firms," Highbeam Research, Oct. 30, 2000, printed from http:www.highbeam.com/doc/1G1-66668508.html, 4 pages.
Bell, A., "Web Sites Push Medical Services Shopping. (Brief Article)," National Underwriter Property & Casualty-Risk & Benefits Management, Aug. 21, 2000, printed from http://www.highbeam.com/doc/1G1-65106694.html, 4 pages.
Harrison et al., U.S. Appl. No. 12/558,386, filed Sep. 11, 2009, entitled "Healthcare Card Incentive Program for Multiple Users".
Office Communication, dated Mar. 10, 2009, for U.S. Appl. No. 11/275,399, filed Dec. 29, 2005, 6 pages.
Office Communication, dated Oct. 5, 2009, for U.S. Appl. No. 11/275,399, filed Dec. 29, 2005, 9 pages.
Office Communication, dated May 8, 2009, for U.S. Appl. No. 11/275,401, filed Dec. 29, 2005, 5 pages.
Office Communication, dated Oct. 14, 2009, for U.S. Appl. No. 11/275,401, filed Dec. 29, 2005, 8 pages.
Office Communication, dated Sep. 27, 2007, for U.S. Appl. No. 11/275,403, filed Dec. 29, 2005, 7 pages.
Office Communication, dated Mar. 12, 2008, for U.S. Appl. No. 11/275,403, filed Dec. 29, 2005, 14 pages.
Office Communication, dated Jun. 13, 2008, for U.S. Appl. No. 11/275,403, filed Dec. 29, 2005, 11 pages.
Office Communication, dated Dec. 12, 2008, for U.S. Appl. No. 11/275,403, filed Dec. 29, 2005, 11 pages.
Office Communication, dated Jun. 11, 2009, for U.S. Appl. No. 11/275,403, filed Dec. 29, 2005, 12 pages.
Office Communication, dated Oct. 6, 2006, for U.S. Appl. No. 11/275,405, filed Dec. 29, 2005, 5 pages.
Office Communication, dated May 1, 2007, for U.S. Appl. No. 11/275,405, filed Dec. 29, 2005, 11 pages.
Office Communication, dated Nov. 13, 2007, for U.S. Appl. No. 11/275,405, filed Dec. 29, 2005, 11 pages.
Notice of Allowance, dated Jun. 12, 2008, for U.S. Appl. No. 11/275,405, filed Dec. 29, 2005, 7 pages.
Office Communication, dated Sep. 2, 2008, for U.S. Appl. No. 11/461,365, filed Jul. 31, 2006, 7 pages.
Office Communication, dated Feb. 23, 2009, for U.S. Appl. No. 11/461,365, filed Jul. 31, 2006, 8 pages.
Office Communication, dated Jul. 14, 2009, for U.S. Appl. No. 11/461,365, filed Jul. 31, 2006, 7 pages.
Office Communication, dated Sep. 29, 2008, for U.S. Appl. No. 11/461,374, filed Jul. 31, 2006, 7 pages.
Office Communication, dated Feb. 26, 2009, for U.S. Appl. No. 11/461,374, filed Jul. 31, 2006, 8 pages.
Office Communication, dated Jul. 15, 2009, for U.S. Appl. No. 11/461,374, filed Jul. 31, 2006, 11 pages.
Office Communication, dated Apr. 27, 2009, for U.S. Appl. No. 11/461,389, filed Jul. 31, 2006, 5 pages.
Notice of Allowance, dated Sep. 18, 2009, for U.S. Appl. No. 11/461,389, filed Jul. 31, 2006, 6 pages.
Office Communication, dated Jun. 20, 2008, for U.S. Appl. No. 11/461,392, filed Jul. 31, 2006, 17 pages.
Notice of Allowance, dated May 14, 2009, for U.S. Appl. No. 11/461,392, filed Jul. 31, 2006, 7 pages.
Office Communication, dated Sep. 4, 2008, for U.S. Appl. No. 11/461,394, filed Jul. 31, 2006, 13 pages.
Office Communication, dated May 26, 2009, for U.S. Appl. No. 11/461,394, filed Jul. 31, 2006, 15 pages.
Office Communication, dated Aug. 3, 2009, for U.S. Appl. No. 11/461,394, filed Jul. 31, 2006, 2 pages.
Office Communication, dated Jul. 2, 2008, for U.S. Appl. No. 11/461,396, filed Jul. 31, 2006, 26 pages.
Office Communication, dated Feb. 5, 2009, for U.S. Appl. No. 11/461,396, filed Jul. 31, 2006, 10 pages.
Office Communication, dated Jul. 27, 2009, for U.S. Appl. No. 11/461,396, filed Jul. 31, 2006, 25 pages.
Office Communication, dated Oct. 27, 2009, for U.S. Appl. No. 11/461,396, filed Jul. 31, 2006, 2 pages.
Office Communication, dated Sep. 26, 2007, for U.S. Appl. No. 11/675,438, filed Feb. 15, 2007, 9 pages.
Office Communication, dated Mar. 13, 2008, for U.S. Appl. No. 11/675,438, filed Feb. 15, 2007, 14 pages.
Office Communication, dated Jul. 6, 2009, for U.S. Appl. No. 11/768,708, filed Jun. 26, 2007, 14 pages.
Office Communication, dated Jan. 23, 2008, for U.S. Appl. No. 11/675,478, filed Feb. 15, 2007, 8 pages.
Office Communication, dated Aug. 11, 2008, for U.S. Appl. No. 11/675,478, filed Feb. 15, 2007, 9 pages.
Office Communication, dated Nov. 17, 2008, for U.S. Appl. No. 11/675,478, filed Feb. 15, 2007, 3 pages.
Office Communication, dated Mar. 31, 2009, for U.S. Appl. No. 11/675,478, filed Feb. 15, 2007, 9 pages.
Office Communication, dated Oct. 27, 2009, for U.S. Appl. No. 11/675,478, filed Feb. 15, 2007, 9 pages.
Office Communication, dated Jul. 20, 2009, for U.S. Appl. No. 11/698,955, filed Jan. 29, 2007, 6 pages.
Office Communication, dated Sep. 27, 2007, for U.S. Appl. No. 11/675,456, filed Feb. 15, 2007, 9 pages.
Office Communication, dated Mar. 13, 2008, for U.S. Appl. No. 11/675,456, filed Feb. 15, 2007, 11 pages.
Office Communication, dated Oct. 29, 2008, for U.S. Appl. No. 11/770,367, filed Jun. 28, 2007, 6 pages.
Office Communication, dated Jan. 6, 2009, for U.S. Appl. No. 11/770,367, filed Jun. 28, 2007, 21 pages.
Office Communication, dated Jun. 10, 2009, for U.S. Appl. No. 11/770,367, filed Jun. 28, 2007, 21 pages.
Office Communication, dated Oct. 7, 2009, for U.S. Appl. No. 11/770,367, filed Jun. 28, 2007, 2 pages.
Office Communication, dated Dec. 1, 2009, for U.S. Appl. No. 11/461,374, filed Jul. 31, 2006, 11 pages.
Office Communication, dated Nov. 10, 2009, for U.S. Appl. No. 11/698,955, filed Jan. 29, 2007, 17 pages.
Office Communication, dated Oct. 19, 2010, for U.S. Appl. No. 11/675,478, filed Feb. 15, 2007, 9 pages.
Breitkopf, D., "Card Issuers Jacking Up Phone Fees," American Banker, SourceMedia, Inc., Highbeam Research, printed Aug. 28, 2010 from <http://www.highbeam.com>, 2 pages (Publication Date: Jun. 30, 2003).
Office Communication, dated Aug. 31, 2010, for U.S. Appl. No. 11/461,396, filed Jul. 31, 2006, 16 pages.
Office Communication, dated Sep. 1, 2010, for U.S. Appl. No. 11/561,326, filed Nov. 17, 2006, 7 pages.
"Cybear Group Reports Third Quarter 2001 Results of Operations," Business Editors & Health/Medical/Technology Writers, Business Wire, New York, p. 1 (Oct. 25, 2001).

Fisher, Jean P., "Cary, N.C., Medical Technology Firm May Get Boost from Doctors' Endorsement," Knight Ridder Tribune Business News, Washington, p. 1 (Nov. 13, 2003).

Gal-Or, E., "The profitability of vertical mergers between hospitals and physician practices," Journal of Health Economics, vol. 18, Issue 5, pp. 623-624 (Oct. 1999).

"Health Savings Custodial Account Agreement," Trust Administrators, Inc., 1970 Broadway, Suite 1140, Oakland, California, downloaded from www.trustadmin.com/public_html/graphics/CustodialAgreement.pdf, 3 pages.

Ruess, "Court Snarls MTF Claims Payment Now in Limbo"; [All Editions], Trenton Bureau, The Record, Bergen County, N.J.: Feb. 24, 1994, p. a.01.

Office Communication, dated Nov. 24, 2009, for U.S. Appl. No. 11/275,403, filed Dec. 29, 2005, 7 pages.

Office Communication, dated Mar. 26, 2010, for U.S. Appl. No. 11/275,403, filed Dec. 29, 2005, 16 pages.

Office Communication, dated Mar. 17, 2010, for U.S. Appl. No. 11/461,356, filed Jul. 31, 2006, 13 pages.

Office Communication, dated Aug. 5, 2010, for U.S. Appl. No. 11/461,356, filed Jul. 31, 2006, 22 pages.

Office Communication, dated Apr. 8, 2010, for U.S. Appl. No. 11/461,365, filed Jul. 31, 2006, 9 pages.

Office Communication, dated Jun. 8, 2010, for U.S. Appl. No. 11/461,374, filed Jul. 31, 2006, 14 pages.

Office Communication, dated Jun. 7, 2010, for U.S. Appl. No. 11/461,389, filed Jul. 31, 2006, 10 pages.

Office Communication, dated Feb. 5, 2010, for U.S. Appl. No. 11/461,394, filed Jul. 31, 2006, 12 pages.

Office Communication, dated May 12, 2010, for U.S. Appl. No. 11/461,396, filed Jul. 31, 2006, 27 pages.

Office Communication, dated Mar. 31, 2010, for U.S. Appl. No. 11/561,326, filed Nov. 17, 2006, 10 pages.

Office Communication, dated Dec. 24, 2009, for U.S. Appl. No. 11/674,437, filed Feb. 13, 2007, 7 pages.

Office Communication, dated Jun. 8, 2010, for U.S. Appl. No. 11/674,437, filed Feb. 13, 2007, 15 pages.

Office Communication, dated Apr. 20, 2010, for U.S. Appl. No. 11/675,478, filed Feb. 15, 2007, 9 pages.

Office Communication, dated Mar. 30, 2010, for U.S. Appl. No. 11/698,955, filed Jan. 29, 2007, 12 pages.

Office Communication, dated Jan. 26, 2010, for U.S. Appl. No. 11/768,708, filed Jun. 26, 2007, 14 pages.

Office Communication, dated Dec. 24, 2009, for U.S. Appl. No. 11/770,367, filed Jun. 28, 2007, 25 pages.

Office Communication, dated Jun. 24, 2010, for U.S. Appl. No. 11/770,367, filed Jun. 28, 2007, 25 pages.

Office Communication, dated May 21, 2010, for U.S. Appl. No. 12/558,386, filed Sep. 1, 2009, 15 pages.

Gal-Or, E., "The profitability of vertical mergers between hospitals and physician practices," *Journal of Health Economics*, vol. 18, Issue 5, pp. 623-654 (Oct. 1999).

Office Communication, dated Sep. 28, 2010, for U.S. Appl. No. 11/275,403, filed Dec. 29, 2005, 15 pages.

Office Communication, dated Sep. 10, 2010, for U.S. Appl. No. 11/461,394, filed Jul. 31, 2006, 13 pages.

Office Communication, dated Oct. 12, 2010, for U.S. Appl. No. 12/558,386, filed Sep. 1, 2009, 19 pages.

Office Communication, dated Nov. 8, 2010, for U.S. Appl. No. 11/275,401, filed Dec. 29, 2005, 10 pages.

Office Communication, dated Nov. 4, 2010, for U.S. Appl. No. 11/461,374, filed Jul. 31, 2006, 17 pages.

Notice of Allowance, dated Nov. 30, 2010, for U.S. Appl. No. 11/461,389, filed Jul. 31, 2006, 6 pages.

Office Communication, dated Nov. 15, 2010, for U.S. Appl. No. 11/561,326, filed Nov. 17, 2006, 7 pages.

Notice of Allowance, dated Dec. 21, 2010, for U.S. Appl. No. 11/674,437, filed Feb. 13, 2007, 8 pages.

Office Communication, dated Jan. 5, 2011, for U.S. Appl. No. 11/770,367, filed Jun. 28, 2007, 27 pages.

* cited by examiner

LINKING TRANSACTION CARDS WITH SPENDING ACCOUNTS

CROSS REFERENCE TO RELATED APPLICATIONS

This application claims benefit under 35 U.S.C. §119(e) to U.S. Provisional Patent Application No. 60/697,514, filed Jul. 8, 2005, which is incorporated by reference herein in its entirety.

This application also claims benefit under 35 U.S.C. §120 as a continuation-in-part of U.S. patent application Ser. No. 10/904,639, filed Nov. 19, 2004 now U.S. Pat. No. 7,213,750, which is incorporated by reference herein in its entirety.

BACKGROUND OF INVENTION

1. Field of Invention

The application generally relates to point of sale purchases, and more particularly, to transactions utilizing a payment instrument to access funds in at least one flexible spending account.

2. Background Art

Section 125 of the United States Internal Revenue Code offers tax savings to employees for medical, dependent care and childcare expenses. Likewise, Section 132 of the United States Internal Revenue Code offers employees tax savings for work-related parking and transportation expenses. For example, employees may be entitled to tax benefits if the employees withhold a portion of their payroll to pay for medical, dependent care, childcare, work-related parking expenses and/or work-related transportation expenses. In other words, the employees' payroll is taxed on the amount left after the withheld portion is subtracted from the payroll amount and the withheld portion is placed into a flexible spending account (FSA).

How consumers pay for healthcare expenditures also is changing. Presently, less than 20% of consumer healthcare payments is through use of "plastic," which includes debit cards, charge cards, and credit cards. This percentage is expected to grow by over 10% in five years to approximately 30% by 2010.

Another fundamental change that is expected to occur in the healthcare industry is the increase in use of consumer-directed healthcare plans ("CDHPs"), which offer tax advantages to employers who offer such plans and, for some CDHPs, to employees as well. The shift towards CDHPs, while providing tax and other benefits to employers and/or employees, also entails significant administrative costs borne by the employers. These costs include, for example, the costs associated with maintaining individual accounts for each participating employee. Additionally, providers of healthcare goods/services often encounter significant delays in payment from CDHPs, due to the amount of time necessary to substantiate receipts and to determine the respective payment responsibilities of the insurers and the employees.

There is a need for systems and methods for automatically accessing funds held in an FSA at the point of sale, and specifically, by utilizing a single payment instrument (e.g., a debit card, credit card, charge card, FSA card, RFID, etc.) at the point of sale. In addition, there is a need to access multiple FSAs for different categories of qualifying items utilizing a single payment instrument. Furthermore, there is a need for accessing one or more FSAs and/or one or more non-FSAs utilizing a single payment instrument.

SUMMARY OF INVENTION

The present invention meets the above-identified needs by providing a computer-implemented system and method to facilitate a purchase utilizing a flexible spending account, comprising the steps of: receiving, at a host computer, a request for payment authorization for an item; determining whether the item qualifies for pre-tax treatment; and when the item qualifies for pre-tax treatment: determining at least partial payment authorization for the item, transmitting the at least partial payment authorization for the item to a point of sale device; causing the flexible spending account to be debited for at least a portion of the purchasing amount of the item based on the payment authorization; and debiting a non-flexible spending account for an item not qualifying for pre-tax treatment.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

Figure 1:
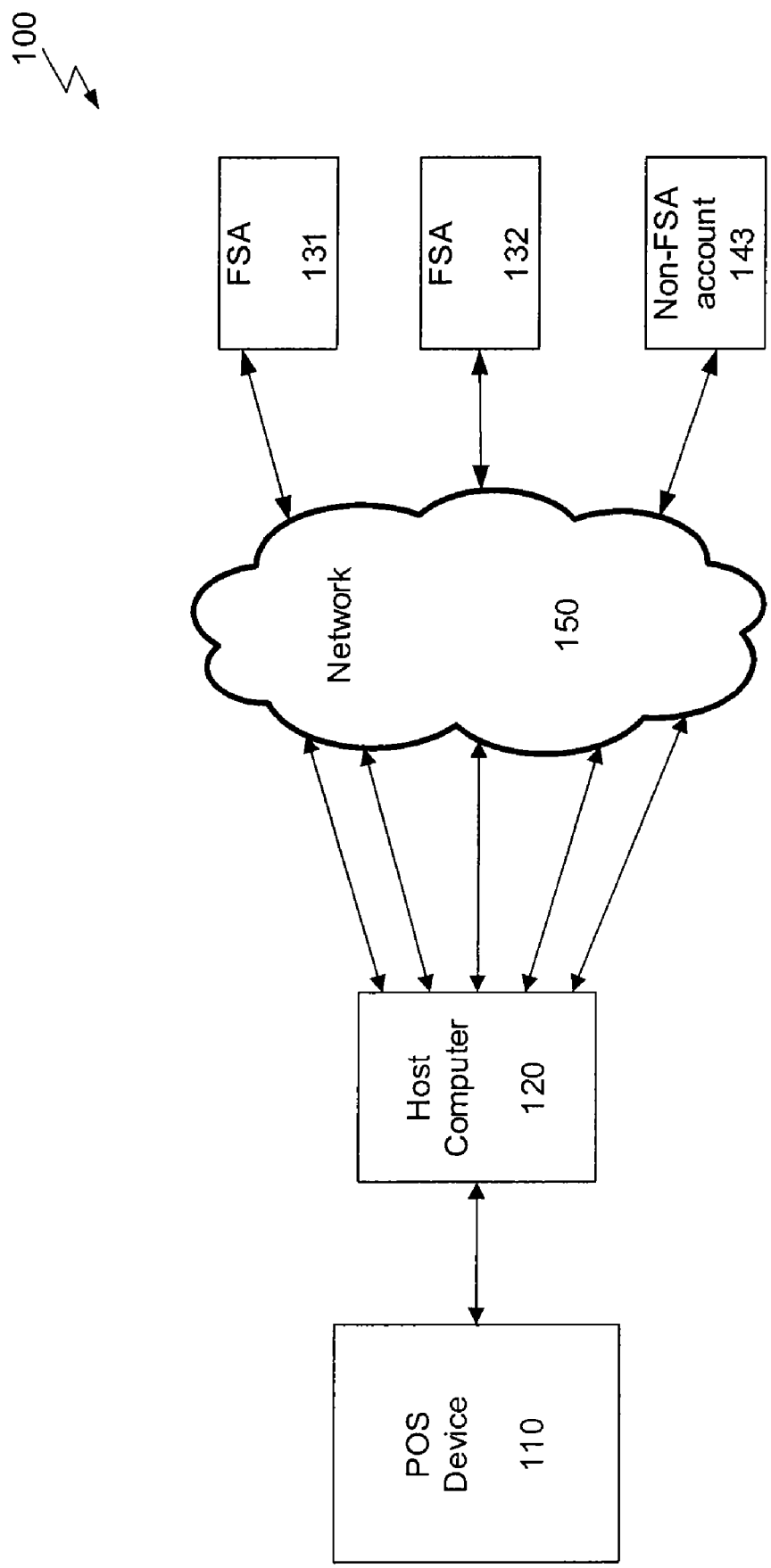
FIG. 1 is a block diagram illustrating an exemplary system configured to facilitate a purchase utilizing a flexible spending account.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

The detailed description of exemplary embodiments of the invention herein makes reference to the accompanying drawings and figures, which show the exemplary embodiments by way of illustration. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Terminology

The term "merchant" as used herein means any person, entity, distributor system, software, and/or hardware that is a provider, broker, and/or any other entity in the distribution chain of goods or services. For example, a merchant may be a credit card issuer, a hotel chain, an airline, a grocery store, a retail store, a travel agency, a service provider, including, but not limited to, a medical service provider, an online merchant, or the like.

A "transaction account" as used herein refers to an account associated with an open account card or a closed account card system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a card that may only be accepted at a clothing retailer, such as a Saks Fifth Avenue® store.

The term "transaction instrument" as used herein may include any type of open or closed charge card, credit card, debit card, FSA card, stored value card, an RFID chip based card or token, and the like. For convenience, a transaction instrument may be referred to as a "card."

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder, radio frequency card or payment statement).

A "Flexible Spending Account" (FSA) is one type of CDHP. An FSA is an account set up to hold the withheld portions, and to pay for certain categories of items that qualify for pre-tax treatment under the Internal Revenue Service Guidelines. As it currently stands, if an employee wishes to, for example, establish both an FSA for qualifying childcare expenses and an FSA for qualifying medical expenses, the employee must establish two FSAs and designate how much of the employee payroll to withhold and credit to each FSA. The employee may then withdraw the funds held in each FSA as the employee purchases qualifying or eligible items associated with each respective FSA.

An FSA card is a transaction instrument that is limited to use with a subset of merchants who provide goods or services that satisfy the Internal Revenue Service Guidelines for FSAs. The FSA card is linked to a Flexible Spending Account.

For the sake of brevity, conventional data networking, application development and other functional aspects of the systems (and components of the consumer operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Persons skilled in the relevant arts will understand the breadth of the terms used herein and that the exemplary descriptions provided are not intended to be limiting of the generally understood meanings attributed to the foregoing terms.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

Overview

The invention relates to a linked card system used with an FSA card. The FSA card allows consumers the flexibility to pay for medical services directly from an FSA. The FSA is usually established through the consumer's employer and allows consumers to contribute pretax dollars to an account for the purposes of paying medical expenses. With the FSA card, medical bills may be paid directly without the need for the consumer to pay out of pocket expenses first and be later reimbursed. Additionally, the FSA card allows medical service providers to bill the consumer's medical insurance upon use of the FSA card.

An FSA is strictly regulated by the Internal Revenue Service regarding what goods and services can be purchased through the FSA. An FSA is typically administered by a third-party administrator ("TPA") that determines what services and goods can be purchased through the FSA. For example, medical service providers, such as doctors or dentists, are usually covered and can be paid with FSA funds. However, vitamins typically are not eligible. FSA funds cannot be used to pay for ineligible goods or services. FSA funds are used to reimburse the payor.

Currently, the FSA card is intended for use with health care providers and merchants. For example, at present the FSA card can only be used to pay for goods and services furnished by doctors, hospitals, drug stores, and other medical supply merchants. The purpose of this limitation at present is to minimize the costs associated with substantiating eligible charges. To make the FSA card use attractive to customers, the FSA card can be used at any eligible merchant to purchase both eligible and ineligible goods and services. Thus an FSA card can be used to purchase eligible prescriptions and ineligible magazines at a CVS® or Eckards® drug store, for example. It will be understood by persons skilled in the relevant arts that there is no technical reason why an FSA card could not have extended use and be used to charge purchases generally at a wide range of merchants.

Currently, to withdraw funds held in an FSA for qualifying expenses, the employee typically must first purchase the qualifying item, then request the FSA administrator to reimburse the employee for the purchase. More specifically, the employee is usually required to pay for the item at the point of sale, complete and file a claim form along with the sales receipt, wait for the FSA administrator to process and approve the claim, and wait to receive reimbursement. Thus, the current process for withdrawing FSA funds for qualifying expenses is time consuming, requires the employee to be "out of pocket" until reimbursement arrives, and necessitates that the employee perform various tasks after the purchase. Furthermore, in situations where the employee incurs a claim for expenses in different types of FSAs (e.g., a medical expense FSA and a childcare FSA), the employee is generally required to file two claims, one for each respective FSA, following the above steps.

To facilitate direct access to the funds stored in an FSA, a payment instrument is linked to at least one FSA, and amounts held in the FSA are accessed for payment when a valid charge is executed utilizing the payment instrument. The payment instrument may be, for example, a debit card, a credit card, a charge card, an FSA card, a RFID, a chip based card, a stored value card, and the like.

When the consumer purchases an item, the consumer typically presents the payment instrument as payment to a merchant. The merchant enters the transaction data into a point of sale (POS) device. The POS device then transmits a request for payment authorization, which may include any portion of the transaction information, to a host computer. Once the request for payment authorization is received, the host computer determines whether the item being purchased qualifies for pre-tax treatment. If at least one item qualifies for pre-tax treatment, the host computer transmits payment authorization to the POS device and debits at least one FSA for the authorized amount. In addition, the host computer may debit at least one non-FSA account for an item which does not qualify for pre-tax treatment, yet may be included in the request for payment authorization.

The linked card system provides additional functionality for the FSA card. In one option, the linked card provides the ability to link any transaction instrument or transaction account to the FSA card for any ineligible or unsubstantiated charges. For instance, a card holder uses a medical service provider which does not qualify for payment under the card holder's current health plan. Because the service provider does not qualify, the FSA card will not authorize payment. In this case, the card holder's transaction account will be charged for the payment. This arrangement reduces the likelihood of the pay and chase scenario. In the "pay and chase" scenario, the FSA card authorizes payment only to later discover that the card holder must make payment. The card holder is then billed and "chased" for payment. Linking the transaction account of the card holder to the FSA card automatically authorizes payment from the transaction account when ineligible or unsubstantiated charges are made. This reduces the likelihood of the pay and chase scenario and further reduces administrative costs.

In another option, the linked card allows for existing card holders to use their card for FSA expenses against their FSA account. This provides for a virtual health FSA within a normal card. The FSA and its functionality is linked to the card holder's transaction account. Eligible spending is deducted from the FSA rather than being billed to the card holder's transaction account. Ineligible spending or normal purchases for goods and services unrelated to health care are charged to the card holder's transaction account. This reduces the number of cards a user must carry.

In operation, a processor sends a transaction data update to a card platform. Auto substantiation is performed. If the transaction cannot be auto substantiated, a third-party administrator ("TPA") contacts the card member requesting substantiation. If the card member cannot substantiate the transaction, then the TPA uses the transaction account's auto-bill pay functionality and sends a charge to the card member's transaction account.

EMBODIMENTS

In a typical FSA, which is the most established of the CDHPs, an employer deducts pre-tax dollars from an employee's paycheck to cover IRS-approved healthcare expenses. The deducted amount is put into the employee's FSA. The employee pays for healthcare goods and/or healthcare services ("goods/services") out of pocket, and submits a receipt for the goods/services for substantiation and reimbursement. A TPA reviews the receipt and confirms the purchase of the goods/services. Once confirmed, the TPA sends a reimbursement check to the employee and the TPA is reimbursed by the employer. Funds in the FSA that are not used by the employee by the end of the year are forfeited to the employer. TPAs have begun to offer debit cards to employees for payment of healthcare goods/services. These debit cards enable automation of some aspects of claims substantiation.

Turning now to the figures, FIG. 1 is a block diagram illustrating an exemplary embodiment of a system 100 which utilizes at least one merchant point of sale (POS) device 110 to facilitate the purchase of at least one item utilizing one or more flexible spending accounts. In one embodiment, system 100 may facilitate the secure payment and funding services using a pre-funded account (e.g., FSA 131, discussed below) while substantially protecting the privacy of the transaction participants. The comprehensive payment service may be based upon a consolidated account that stores value to be used in on-line and off-line transactions. System 100 may also include processes for authenticating participants, authorizing transactions, and settling payments. As such, embodiments of the present invention may enable merchants to effectively accept non-standard forms of payment at POS device 110 without changing their current payment infrastructures. Embodiments of the present invention may also enable the provision of value for purchases at any network merchant using a variety of sources of value. For further information related to these features, see the patent application entitled CONSOLIDATED PAYMENT ACCOUNT SYSTEM AND METHOD, by inventors: David Armes, et al., filed on Jun. 21, 2002 as Ser. No. 10/176,729, which is hereby incorporated by reference.

POS device 110 may be any software and/or hardware suitably configured to facilitate a purchase. In one embodiment, POS device 110 may be configured to receive payment data and/or transaction data. POS device 110 may also be configured to transmit a request for payment authorization, which may include payment data and transaction data, to at least one host computer 120. As used herein, "transmit" may include sending electronic data from one system component to another over a network connection. Additionally, as used herein, "data" may include encompassing information such as commands, queries, files, data for storage, and the like in digital or any other form. "Transaction data" may include, for example, the amount of purchase, at least one payment instrument account number, at least one payment account number, at least one item identifier for each item being purchased, loyalty information, demographic information and/or any other data helpful in processing a transaction. POS device 110 may be a consumer computing unit in the form of a personal computer, although other types of computing units may be used including laptops, notebooks, hand held computers, set-top boxes, cellular telephones, touch-tone telephones and the like. Moreover, POS device 110 may be a merchant computing unit implemented in the form of a computer-server, although other implementations are contemplated. Moreover, reference to a single POS device, host computer, item or any other component may include one or more POS devices, host computers, items or other components, respectively.

A payment instrument may be associated with, for example, one or more of a flexible spending account (FSA) having an account number, an FSA card, a credit card, a debit card, a charge card, a RFID, a chip based card, a stored value card and/or any other instrument capable of being presented for payment of an item. The payment instrument may be co-branded, include the issuer and employer logo, and/or other trademarks. In addition, the payment instrument may be linked to at least one FSA and/or at least one non-FSA account, both of which are discussed in greater detail below. A payment account may include a transaction instrument-less payment account wherein account information (e.g., account number) may be entered into POS device 110 without using, for example, a card or other physical instrument. In one embodiment, the account may sit on Triumph, and not have any instrument associated with the account. An "account" or "account number", as used herein, may include, for example, any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a fob having a transponder and RFID reader in RF communication with the fob. Although the present invention may include a fob embodiment, the invention is not to be so limited. Indeed, system may include any device having a transponder configured to communicate with RFID reader via RF communication. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include, but are not limited to, watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A consumer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the consumer. A merchant account number may be, for example, any number or alpha-numeric characters that identifies a particular merchant for purposes of card acceptance, account reconciliation, reporting, or the like.

As used herein, an "item" may be one or more information, good and/or service capable of being exchanged between entities. In addition, an "item identifier" may include, for example, one or more universal product code (UPC), a stock-keeping unit (SKU), a serial number, a reference number, a category number, a service type indicator, a description and/or other any other information capable of identifying an item.

System 100 may also include a host computer 120. Host computer 120 may be any hardware and/or software suitably configured to communicate and/or process transaction information. In an exemplary embodiment, host computer 120 (or any other computer component discussed herein) may include a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Furthermore, though shown as a main frame computer, host computer 120 may be implemented in other forms, such as a mini-computer, a PC server, a network of computers located in the same of different geographic locations, or the like.

In one exemplary embodiment, host computer 120 may be configured to receive and process a request for payment authorization from POS device 110. An electronic commerce system may be implemented at POS device 110 and host computer 120. In an exemplary implementation, the electronic commerce system is implemented as computer software modules loaded onto POS device 110 and host computer 120. Host computer 120 may not require any additional software to participate in any online commerce transactions supported by an electronic commerce system. Host computer 120 may also be configured to compare an item identifier received from POS device 110 to a list of item identifiers for items qualifying for pre-tax treatment stored within memory of host computer 120. Furthermore, host computer 120 may include rules and/or algorithms for searching and/or comparing a list of stored item identifiers to an item identifier received from POS device 110. Host computer 120 may additionally be configured to transmit full or partial payment authorization, and/or at least one appropriate decline message to POS device 110.

An "item qualifying for pre-tax treatment" may include any item that may be purchased with untaxed payroll funds. In one embodiment, an item qualifying for pre-tax treatment is an item included in the Internal Revenue Service Guidelines, which may be changed over time. In addition, an item qualifying for pre-tax treatment may be set and/or changed by any person or entity. Furthermore, an item qualifying for pre-tax treatment may originate at the employer, any third party that may administer the FSA, and/or a tax related servicing entity. However, some additional restrictions on coverage may be defined by the employer because the employer may assume the legal risk for some payments. In one embodiment, an information card may be distributed to employees, employers, and/or FSA administrators explaining which expenses and/or items qualify for pre-tax treatment.

System 100 may be configured to allow an employer, consumer and/or any other person or entity with certain access rights to FSA 131 to override any decline (e.g., denial of verification) and allow the request for payment to be authorized. In this regard, system 100 may also include an online service accessible via any network (e.g., network 150, discussed below) that allows the employer, consumer and/or third party to check an FSA and charges that were applied against/debited from the FSA, with an opportunity to adjust and/or enter other charges incurred on the payment instrument for this purpose as well (e.g., in case the issuer or acquirer did not recognize a charge properly).

Other features may include, for example, a consumer or a third party to provide approval to charge an account when a billing amount is determined (e.g., after adjudication of the claim); different awards or loyalty features for non-healthcare spending and/or for healthcare spending; preferred member pricing; services multiple players and change of payers (e.g., open enrollment); payer-funded (possibly co-branded) identification features, using the payer's provider portals and other available resources; external integration tools; checking co-pays; checking eligibility status; combine with insurance and/or FSA; rollover allowed or determined by employer; ability to access and draw from multiple FSA and health savings accounts (HSAs); automatic identification of healthcare transactions; roll up accounts into a corporate hierarchy; link flexible spending accounts to existing consumer or corporate accounts; and, routing transactions to different third party accounts.

In one exemplary embodiment, host computer 120 may be configured to debit multiple FSAs according to a predetermined, random or rule based order. Moreover, host computer 120 may be configured to provide a discount to FSA 131, and/or be configured to receive a transaction fee from one or more entities associated with host computer 120. In the set-up of a registration profile, specialized FSAs may be targeted and pre-authorized for specific transaction types and/or items. In addition, post-issue modifications may also be available.

Host computer 120 may also be configured to automatically develop receipts, wherein the receipts may be required for tax purposes and for use related to FSA 131. The receipt may be a confirmed record which lists disputes and other post sale actions. In one embodiment, the receipt may be consolidated and may be configurable. The consolidation may be across multiple FSAs which may be applicable with, for example, corporate accounts or a Small Business Services (SBS). Host computer 110 may issue an end of year statement for the consumer as receipt tracking. In one embodiment, host computer 120 may archive in a database a ROC (receipt of charge) associated with a charge in FSA 131 and, if necessary, help as receipt backup for tax purposes. As such, the additional ROC information along with the statements from host computer 120 provide added value. Host computer 120 may charge the consumer a fee for the archival services or any other services discussed herein. In one embodiment, host computer 120 may supply line item detail statements at the end of the year, wherein the statement discloses each purchase. The service may only be available for certain levels of consumers or certain levels of transaction instruments (e.g., Gold and Platinum cards). Any charges may be paid directly out of FSA 131 using existing or customized stored value systems.

In an exemplary embodiment, host computer 120 may be configured to generate a report detailing transactions occurring within a specified period of time. Reporting may include similar technology and systems as are known in the art for corporate payment instrument reporting. For example, the administrator of host computer 110 may have a reporting relationship at the consumer level and/or corporate level. The consumer level may include monthly statements for each FSA. The statements may be in electronic (e.g. XMS) or paper (e.g., international) form and sent out to the consumer via mail, email, pager or any other communication system or method known in the art. The statements may detail merchant, date, time, and/or amount. In one embodiment, the statements may not include consumer components of the transaction. At the corporate level (e.g., the employer), the system may help corporations manage their expense base with, for example, logistics, reporting tools, etc. A degree of flexibility may exist as to how the corporation desires to manage the accounts. For example, the corporation may settle the account directly and be responsible for reviewing the eligibility of each charge (e.g. for internal employees) or the individual employee may be responsible for settling the account balance and then apply to the corporation for reimbursement of the eligible expenses. Host computer 120 may help the corporation manage their expense base by reporting on the nature of the transactions across their employee base over a certain period of time (e.g. quarterly, annually, etc). The report may include information such as, for example, certain expenses represent x % of their expense base and are split across six suppliers. As such, if they were to establish a preferred supplier arrangement with for example, three pharmaceutical manufacturers, they may reduce their expense base. To maintain privacy, host computer 120 may customize the reporting so as to firewall certain detail from employers (or their outsourced expense review administrators), but still release sufficient information to make it valuable for expense base tracking and management.

Host computer 120 may also be configured to allow the consumer to pay on their personal computer with automatic payment tracking. For example, the consumer may pay online for prescriptions like Express Scripts or at a doctor's office using a payment instrument.

Host computer 120, in an exemplary embodiment, may be configured to communicate with FSA 131 and/or non-FSA account 143, determine an appropriate FSA 131 and/or non-FSA account to debit for each received request for payment authorization, and/or debit FSA 131 and/or non-FSA account 143 for an authorized payment amount. Similarly, any reference to FSA 131 or non-FSA account may also include at least one additional FSA (e.g., FSA 132) or non-FSA account (not shown).

FSA 131 may be any software and/or hardware suitably configured to manage records relating to funds. FSA 131 may be configured to store pretax dollars, and a consumer may establish FSA 131 by specifying a pre-tax amount to be deducted from his/her payroll, and credited to FSA 131. The deducted amount(s) may be held in an employer account, similar to the handling of other deductions, and may be released by the employer for expenditures of items qualifying for pre-tax treatment. As used herein, the terms "employer", "end user", "consumer", "customer", "cardmember", "business" or "merchant" may be used interchangeably with each other, and each shall mean any person, entity, machine, hardware, software or business.

In another embodiment, FSA 131 may be a line of credit account having a line of credit issued to it wherein a consumer may utilize FSA 131 similar to, for example, a charge card or credit card. The line of credit may be issued to FSA 131 by the administrator of FSA 131 or any other entity capable of extending a line of credit to FSA 131. One skilled in the art will appreciate that a "line of credit account" may include a card account, a demand deposit account, a credit line, a money market account, a digital cash account, and/or any other financial account capable of accepting funds or other value that may be converted to funds. One skilled in the art will also appreciate that the word "value" as used herein refers to funds as well as any goods, services, funds, trade credits and accounts receivable that could reasonably be converted to or measured as funds. As a quantity, value refers to the quantity of funds that could reasonably be derived through conversion of the goods, services, funds, trade credits and accounts receivable to funds.

FSA 131 may also be configured to communicate with host computer 120 and be debited by host computer 120 for items qualifying for pre-tax treatment. In one embodiment, once a transaction including an item qualifying for pre-tax treatment is approved, the funds may be debited through an automated clearinghouse from FSA 131. Most employers have 3-10 days worth of history on hand and a pre-deposit may be collected from the employer. To reduce the number of non-eligible expenses, a service may exist that focuses on real-time authorization. For example, host computer 120 may obtain data and reject it based on a non-match at the point of sale. The "data" may include links to third party information (e.g., Pharmacy Benefit Managers or PBMs) to facilitate processing prescriptions and advising at least one pharmacy about how much to charge for the medication. If the cost matches the billed amount, and the transaction is payable to a pharmacy, then the charge may be validated. Insurance companies may also provide the same type of validation information. Substantiation data may also be LID (line item detail) data associated with a charge. If these checks were to fail, the system may revert to the current process of having the consumer send in receipts to a third party administrator.

Other current offerings may split the approval and authorization (is it a valid expense) into two separate steps. An interim payment processor based system may include systems from, for example, Evolutions Benefits, Medi-Bank and Smart-Flex. These companies offer a product that is used by a third party administrator to review receipts. To handle the entire end-to-end process, system 100 may include an issuing institution on a financial network. System 100 may also provide an FSA and a non-FSA account on the same financial account and/or linked to the same payment instrument.

FSA 131 may be managed and/or linked to funding sources in various ways, such as, for example, U.S. Ser. No.: 10/318,480, filed on Dec. 13, 2002 by Berardi et al. and entitled "SYSTEM AND METHOD FOR ASSIGNING A FUNDING SOURCE FOR A RADIO FREQUENCY IDENTIFICATION DEVICE"; U.S. Ser. No.: 10/318,432 filed on Dec. 13, 2002 by Berardi et al. and entitled "SYSTEM AND METHOD FOR SELECTING LOAD OPTIONS FOR USE IN RADIO FREQUENCY IDENTIFICATION IN CONTACT AND CONTACTLESS TRANSACTIONS", both of which are attached and hereby incorporated by reference. Also, see attached documents which disclose inventions related to "SYSTEMS AND METHODS FOR MANAGING MULTIPLE ACCOUNTS ON A RF PAYMENT INSTRUMENT" by Beenau, et al. and "SYSTEMS AND METHODS FOR PROVIDING A RF TRANSACTION DEVICE OPERABLE TO STORE MULTIPLE DISTINCT ACCOUNTS" by Beenau, et al.

In an exemplary embodiment, FSA 131 may be configured to communicate with host computer 120 via a network 150. Network 150 may include, for example, any electronic communications means which incorporates both hardware and software components of such. Communication among the devices in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference. Moreover, system 100 contemplates the use, sale or distribution of an item or information over any network having similar functionality described herein.

The various system devices (e.g., POS device 110, host computer 120, FSA 131 and non-FSA 143) may be independently, separately or collectively suitably coupled to network 150 via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

System 100, in an exemplary embodiment, may include at least one non-FSA account 143. Non-FSA account 143 may be any software and/or hardware suitably configured to hold funds and/or loyalty rewards, and communicate with host computer 120 via network 150. Non-FSA 143 may include, for example, a credit card account, a checking account, a savings account, a charge card account, a retirement account (e.g., a 401 K, an IRA, etc.), a loyalty rewards account, an HSA and/or any other type of account capable of being credited and/or debited for a purchase.

In one embodiment, non-FSA account 143 may be configured to have host computer 120 debit non-FSA account 143 for an amount of a non-qualifying item and/or partially qualifying amount. Furthermore, non-FSA account 143 may be configured to cause host computer 120 to credit non-FSA account 143 a discount amount similar to FSA 131 discussed above, or credit non-FSA account 143 with loyalty awards (e.g., loyalty points) in an instance when non-FSA 143 is a loyalty account. In this case, non-FSA account 143 may be any type of loyalty account known in the art. Furthermore, non-FSA account 143 may be a HSA configured to allow withdrawal of funds within the HSA to pay for health related-expenses. In one embodiment, a single payment instrument may be linked to both FSA 131 and non-FSA account 143. For example, a consumer may be capable of accessing funds (or line of credit) in a medical FSA and a HSA using a single FSA card. In another embodiment, FSA 131 may be linked to non-FSA account 143. For example, a single payment instrument (e.g., a credit card, charge card, debit card, etc.) may be utilized to pay for multiple items and charged to a single account (e.g., credit card account, charge card account, checking/savings account, etc.). The charges may be separated by category and debited to the appropriate account. For example, each charge may be evaluated at the end of a specified period of time (e.g., monthly) and then pre-tax qualifying charges may be automatically deducted from FSA 131 and the other charges would remain on non-FSA account 143 (e.g., a credit card account).

System 100 may also be configured such that each device (e.g., POS device 110, host computer 110, FSA 131 and/or non-FSA account 143) is interconnected via a second network, referred to as a payment network. The payment network, which may be part of certain transactions, represents existing proprietary networks that presently accommodate transactions for credit cards, debit cards, and other types of financial/banking cards. The payment network is a closed network that is assumed to be secure from eavesdroppers. Examplary transaction networks may include the American Express®, VisaNet® and the Veriphone® networks.

Various databases used herein may include, for example, client data; merchant data; financial institution data; and/or like data useful in the operation of system 100. As those skilled in the art will appreciate, a user computer may include an operating system (e.g., Windows NT, 95/98/2000, OS2, UNIX, Linux, Solaris, MacOS, etc.) as well as various conventional support software and drivers typically associated with computers. The computer may also include any suitable personal computer, network computer, workstation, minicomputer, mainframe or the like. A user computer may be in a home or business environment with access to a network. In an exemplary embodiment, access is through a network or the Internet through a commercially available web-browser software package.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing consumer files using an ISO/IEC 7816-4 file structure; implementing a domain whereby a dedicated file is selected that exposes one or more elementary files containing one or more data sets; using data sets stored in consumer files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial payment instrument or external to but affiliated with the financial payment instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial payment instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial payment instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain consumers, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the payment instrument user at the stand alone device, the appropriate option for the action to be taken. The present invention may contemplate a data storage arrangement wherein the header or trailer, or header or trailer history, of the data is stored on the payment instrument in relation to the appropriate data.

One skilled in the art will also appreciate that, for security reasons, any databases, systems, devices, servers or other devices of system 100 may consist of any combination thereof at a single location or at multiple locations, wherein each database or system includes any of various suitable security features, such as firewalls, access codes, encryption, decryption, compression, decompression, and/or the like.

System 100 may be described herein in terms of functional block components and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, system 100 may be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, system 100 may be embodied as a customization of an existing system, an add-on product, upgraded software, a stand-alone system, a distributed system, a method, a data processing system, a device for data processing, and/or a computer program product. Accordingly, system 100 may take the form of an entirely software embodiment, an entirely hardware embodiment, or an embodiment combining aspects of both software and hardware. Furthermore, system 100 may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks' of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Figure 2:
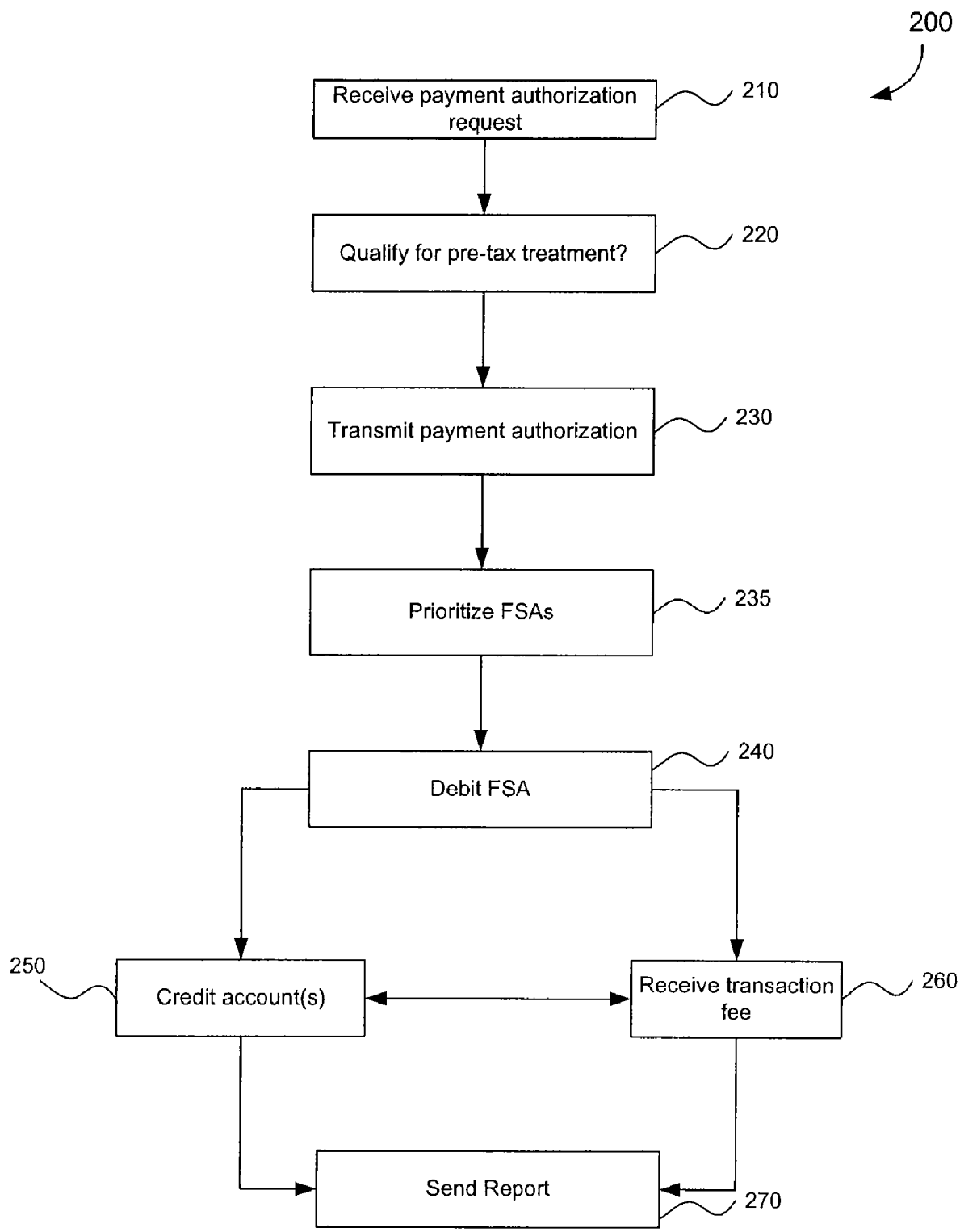
FIG. 2 is a flow diagram illustrating an exemplary method to facilitate a purchase utilizing a flexible spending account.

FIG. 2 is a flow diagram illustrating an exemplary computer-implemented method 200 to facilitate the purchase of an item utilizing an FSA. A host computer (e.g., host computer 120) may receive a request for payment authorization for an item from a POS device (e.g., POS device 110) (step 210). In one embodiment, the request for payment authorization may also include payment data and transaction data. The host computer may process the request for payment authorization to determine if the purchase includes an item qualifying for pre-tax treatment (step 220). In one exemplary embodiment, the host computer may compare an item identifier received from the POS device to a list of item identifiers stored within the host computer to determine if there is a match between an item being purchased and an item qualifying for pre-tax treatment. In other words, to determine if an item being purchased qualifies for pre-tax treatment.

The host computer may transmit full or partial payment authorization to the POS device if there is a match between an item identifier received by the host computer and an item identifier stored in the host computer (step 230). The host computer may transmit full payment authorization if the item being purchased qualifies for pre-tax treatment. In another embodiment, the host computer may transmit only partial payment authorization. Partial payment authorization may occur in situations where an item being purchased does not qualify for pre-tax treatment, and/or where an item being purchased only qualifies for partial pre-tax treatment. In these situations, the host computer may transmit payment authorization only for the amount equal to the proportional cost of an item qualifying for pre-tax treatment, and/or an amount equal to the partially qualifying amount.

Host computer 120 may additionally transmit only partial payment authorization if there are not sufficient funds available in an FSA (e.g., FSAs 131 and/or 132), either individually or collectively, to cover full payment. In this situation, the partial payment authorization may be less than or equal to the FSA credit balance(s), either individually or collectively. In another embodiment, the host computer may transmit full payment authorization, and any deficient amount may be subsequently recovered from the consumer by the administrator of the FSA (if the FSA is debited for the full amount) and/or the administrator of the host computer (if the host computer "covers" the deficient amount).

Host computer 120 may debit an FSA for the full or partial payment authorization amount (step 240). The host computer may debit a single FSA (e.g., FSA 131) for the full payment authorization amount or may debit a first FSA (e.g., FSA 131) for a partial amount and a second FSA (e.g., FSA 132) the remaining amount of the request. In one embodiment, the host computer may debit several FSAs until the host computer has debited the full payment authorization amount. The host computer may determine which FSA to debit based upon the type of item being purchased. For example, the host computer may determine that at least one associated FSA is a medical FSA, and debit the FSA for an amount representing the cost of a qualifying medical item. In addition, in situations where there are multiple items qualifying for pre-tax treatment, the host computer may debit at least one FSA for an amount representing the cost of each qualifying item. In other words, at least one appropriate type of FSA may be debited for each type of qualifying item. For example, host computer 120 may debit at least one medical FSA for an amount representing the cost of each qualifying medical item and at least one dependent care FSA for an amount representing the cost of each qualifying dependent care item included within a single request for payment authorization.

In one exemplary embodiment, the host computer may determine an order in which to debit one or more FSAs (step 235). The order may be established by overall rules about how an FSA is to be used. The order may be based upon the amount of credit within each FSA, such as, use the FSA with the higher/lower amount of credit first. In addition, the order may be based upon at least one date when funds within each respective FSA will expire. For example, an employee may have an FSA from a previous employer (old FSA) and a second FSA maintained by the current employer (current FSA). If the old FSA expires in June, while the current FSA does not expire until December, the two may be linked to a single payment instrument, with rules set up to draw from the old FSA first, and the more current FSA second. The debit amount may be subject to (or re-calculated based upon) any deductibles, prepayments, discounts, coupons, etc.

Host computer 120, in an exemplary embodiment, may credit an amount to an FSA to reflect a discount given to the consumer and/or credit a loyalty account of the customer (step 250). In one embodiment, the discount and/or loyalty credit may be given to the consumer for presenting a particular payment instrument (e.g., an American Express® charge card) as payment for the purchase, for purchasing a particular item, for making a purchase greater than a pre-determined amount, for accumulating purchase amounts greater than a pre-determined amount, and/or for any other reason for providing a discount to a consumer. The discount and/or loyalty credit may be given to the consumer from the payment instrument issuer, manufacturer of the item being purchased, the merchant selling the item, the administrator of the FSA, the government, and/or any other entity that may provide a discount and/or loyalty credit to a consumer.

In another exemplary embodiment, the host computer may receive a transaction fee for each transmitted payment authorization (step 260). The transaction fee may be a set amount, a changing amount, random amount, percentage of the purchase amount and/or the like. In one embodiment, the transaction fee may be received from the merchant requesting payment authorization, the FSA, the FSA administrator, the consumer, and/or any other entity appropriate to charge a transaction fee.

In yet another exemplary embodiment, the host computer may send a report to the consumer, merchant, a government agency and/or administrator of the FSA detailing each transaction (step 270). The report may be sent daily, weekly, monthly, quarterly, semi-annually, annually and/or any other specified period of time.

Figure 3:
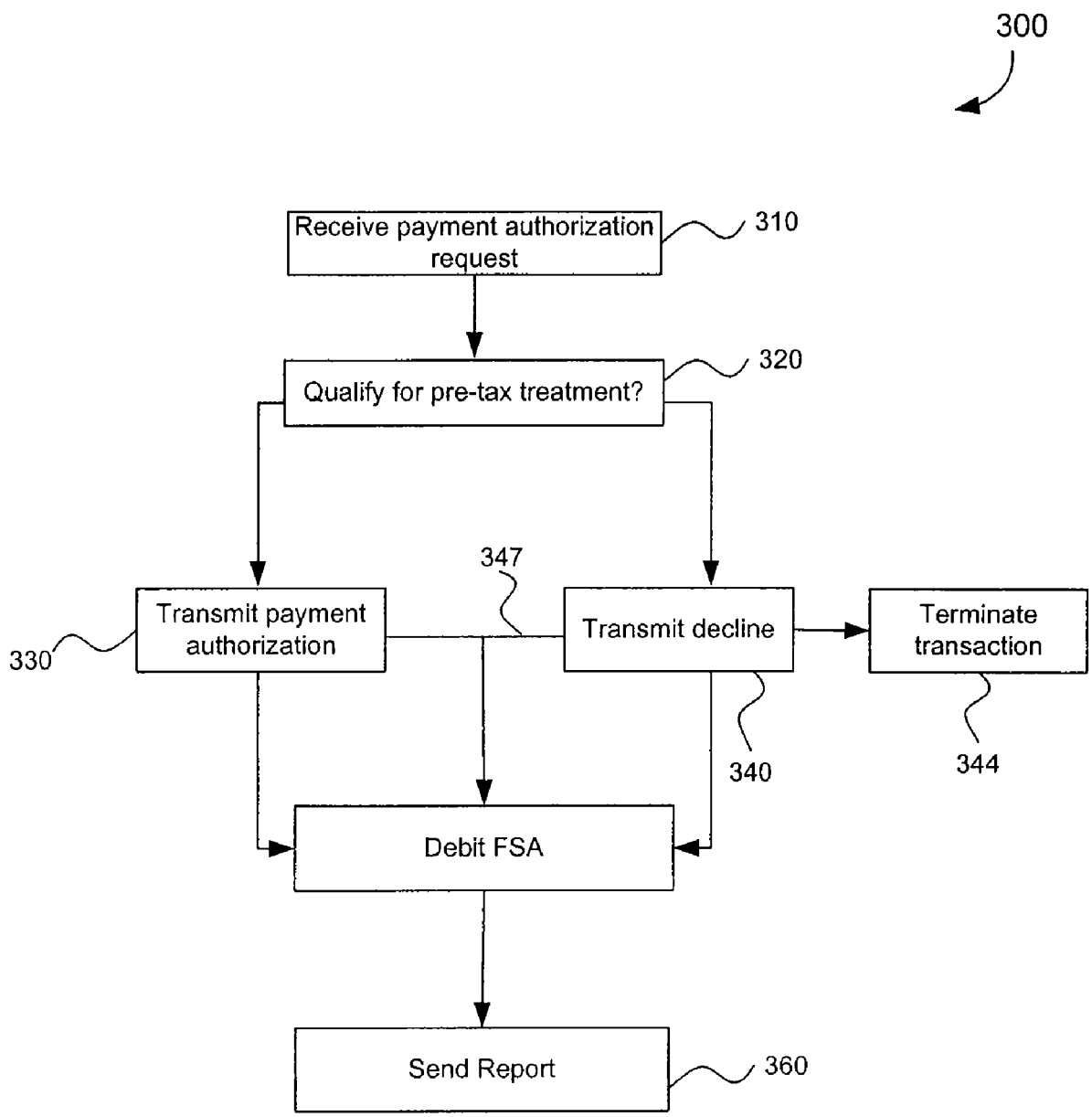
FIG. 3 is a flow diagram illustrating another exemplary method to facilitate a purchase utilizing a flexible spending account.

FIG. 3 is a flow diagram illustrating another exemplary computer-implemented method 300 to facilitate a purchase utilizing an FSA. Host computer 120 may receive a request for payment authorization from a POS device (e.g., POS device 110) similar to step 210 discussed above (step 310). In addition, host computer 120 may determine if an item qualifies for pre-tax treatment similar to step 220 discussed above (step 320). Host computer 120 may also transmit full or partial payment authorization to the POS device similar to step 230 discussed above (step 330).

If the request for payment authorization includes an item that does not qualify for pre-tax treatment and/or an item that only qualifies for partial pre-tax treatment, in one exemplary embodiment, host computer 120 may transmit a "decline" message to the POS device (step 340). The decline message may decline only the amount of the item that does not qualify for pre-tax treatment and/or the non-qualifying partial amount. Moreover, the decline message may decline the entire amount of the payment authorization and terminate the request for payment authorization (step 344). In one embodiment, partial payment authorization may be transmitted by the host computer in accordance with step 330 along with a decline message in accordance with step 340 (step 347). The system may request that the customer pay for all or a portion of the item with another account, then the system may authorize the reduced amount.

In one embodiment, method 300 may also include the host computer debiting at least one FSA for the authorized amount (whether it be full or partial) similar to step 240 discussed above (step 350). In addition, the host computer may also send a report similar to step 270 discussed above (step 360).

Figure 4:
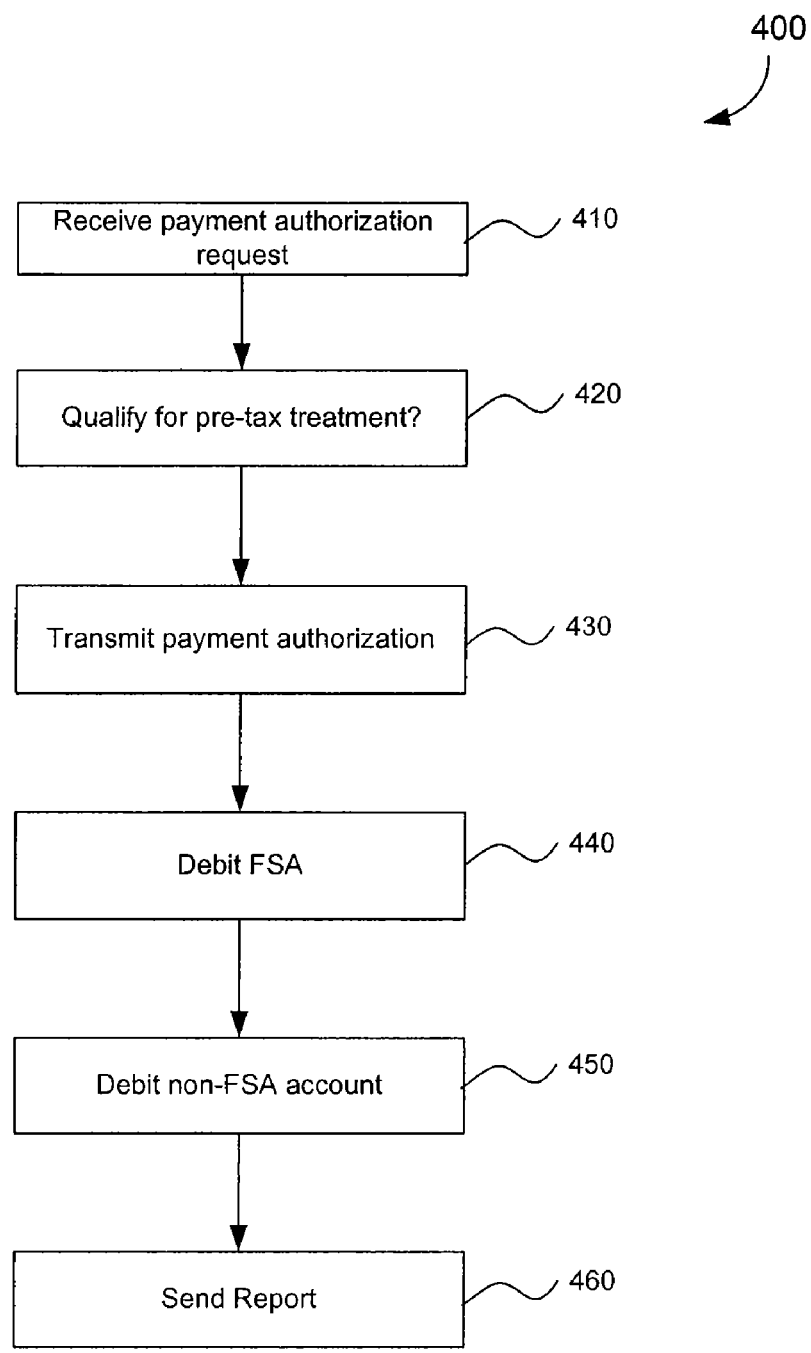
FIG. 4 is a flow diagram illustrating an exemplary method to facilitate a purchase utilizing a flexible spending account and a non-FSA account.

FIG. 4 is a flow diagram illustrating an exemplary computer-implemented method 400 to facilitate a purchase utilizing an FSA and a non-FSA account. Host computer 120 receives a request for payment authorization from a POS device (e.g., POS device 110) similar to steps 210 and 310 discussed above (step 410). Furthermore, the host computer may determine if an item qualifies for pre-tax treatment similar to steps 220 and 320 discussed above (step 420). Moreover, host computer 120 may transmit full or partial payment authorization to the POS device similar to steps 230 and 330 discussed above (step 430), and debit an FSA similar to steps 240 and 350 discussed above (step 440).

In one exemplary embodiment, method 400 may include the host computer debiting a non-FSA account (e.g. non-FSA account 143) for an item not qualifying for pre-tax treatment or for an item that may only qualify for partial pre-tax treatment (step 450). For example, the host computer may debit a non-FSA account for vitamins since vitamins may not qualify for pre-tax treatment. The host computer may also debit a non-FSA account (for vitamins) and, for example, a medical FSA for cough syrup included in a single request for payment authorization. In one embodiment, method 400 may also include the host computer sending a report (step 460) similar to step 270 discussed above. Thus, method 400 contemplates debiting at least one FSA and at least one non-FSA account for one or more items qualifying and one or more items not qualifying for pre-tax treatment that may be included in a single request for payment authorization.

Figure 5:
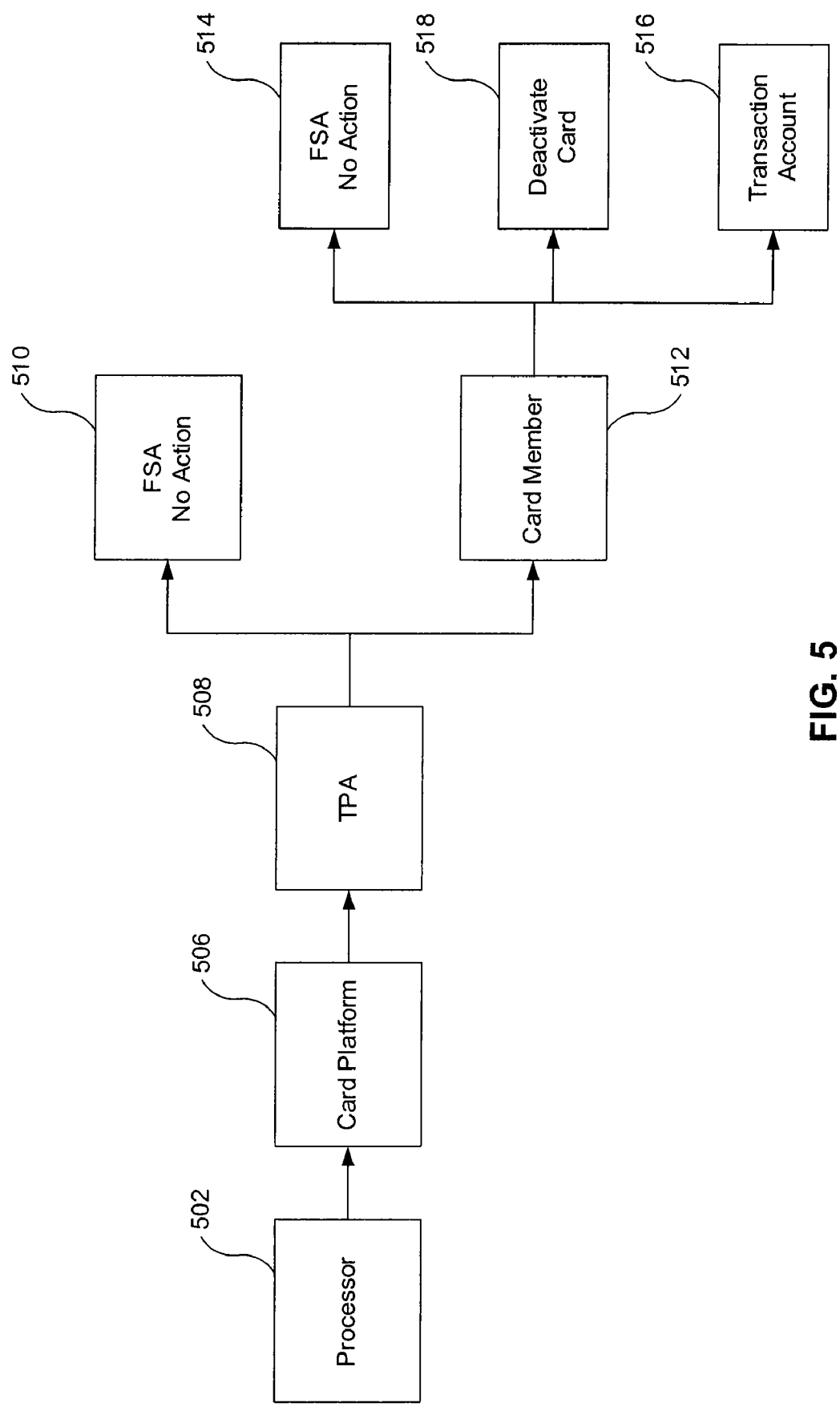
FIG. 5 is a flow diagram further illustrating an exemplary method to facilitate a purchase utilizing a flexible spending account and a non-FSA account.

FIG. 5 shows an example of a linked card transaction using an FSA card that is linked to an FSA and to a transaction account. In this example, a Processor, a Card Platform, and a Third Party Administrator are third party entities. The functions performed by each may be combined into one or more entities. For example, the Processor and Card Platform may be combined in a single entity; similarly, the Card Platform and TPA functions may be combined in a single entity. Alternatively, all three functionalities may be combined in a single entity.

In the system shown in FIG. 5, when a customer completes a transaction using an FSA card, the merchant sends the transaction information to Processor 502. Processor 502 may do some initial checks to determine whether the transaction is authorized. Such checks may include one or more of determining whether the merchant is a valid healthcare merchant; whether the Card is active; and whether there is a sufficient balance on the Card. A card may be declined and the transaction not authorized for any number of reasons. For example, the card may be declined if the merchant code is incorrect, that is the merchant code does not correspond to one with which an FSA card may be used. Another reason may be that the card is invalid or inactive. The employee may be ineligible to make FSA based purchases. Or there may be insufficient funds in the employee's FSA.

Following such checks, and if the transaction is authorized, Processor 502 sends the transaction information to a Card Platform 506. Card Platform 506 performs an auto-substantial on the transaction. That is, Card Platform 506 checks the transaction against a database of FSA eligible merchants and goods and/or services to determine whether there is a match. If the transaction matches the list of eligible merchants and goods/services, no further information is needed from the customer. If there are multiple transactions on a single charge, Card Platform 506 separates those charges that are eligible for FSA funding from those that are ineligible. Card Platform 506 then sends the transaction information to a TPA 508.

If no further substantiation of the eligibility for FSA funding is needed, TPA 508 processes the transaction accordingly at step 510. Eligible charges will be funded out of the FSA. Ineligible charges will be billed to the customer. If further substantiation of FSA eligibility is needed, TPA 508 contacts the customer at step 512 to request further substantiation. Such substantiation may, but does not necessarily, take the form of receipts for the goods or services purchased. If, in response, the customer provides adequate substantiation of FSA eligibility, the transaction proceeds to step 514 to withdraw funds from the FSA. If the customer provides no or inadequate substantiation so that TPA 508 cannot determine that the transaction is eligible for FSA funding, TPA 508 may then deactivate the FSA card at step 518 to prohibit further transactions with that FSA card.

If the FSA card is not linked to a transaction account, then TPA 508 must try to collect the ineligible funds from the customer. This may involve sending bills to the customer, calling the customer if he/she is delinquent, etc. It is time consuming, costly, and may not result in a favorable outcome for the TPA. If TPA 508 is unable to collect from the customer, generally the employer will ultimately be responsible for payment for the ineligible good or service. The employer must then collect the funds from the employee. This is the "pay and chase" scenario.

If the FSA card is linked with a transaction account, then TPA 508 may send the ineligible transaction charge to the linked transaction account at step 516. In that event, the ineligible charge is posted to the customer's transaction account. The charge is then billed to the customer by the financial institution that owns the transaction account. This feature has the advantage of avoiding the "pay and chase" scenario described above. The linked transaction account feature ensures that all parties upstream of the customer will be properly reimbursed for the ineligible transaction charges.

Figure 6:
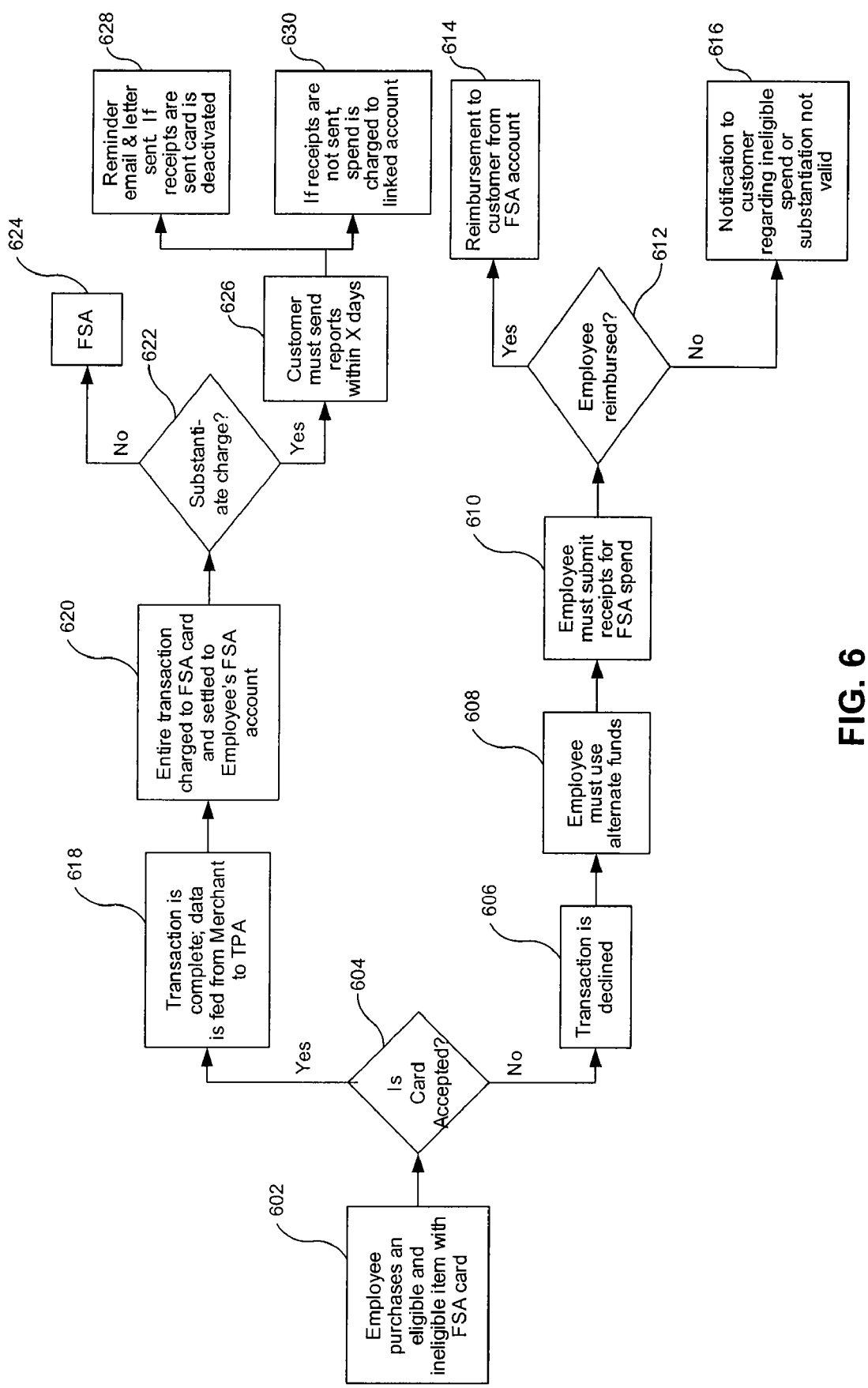
FIG. 6 is a flow diagram illustrating a further exemplary method to facilitate a purchase utilizing a flexible spending account and a non-FSA account.
Figure 7:
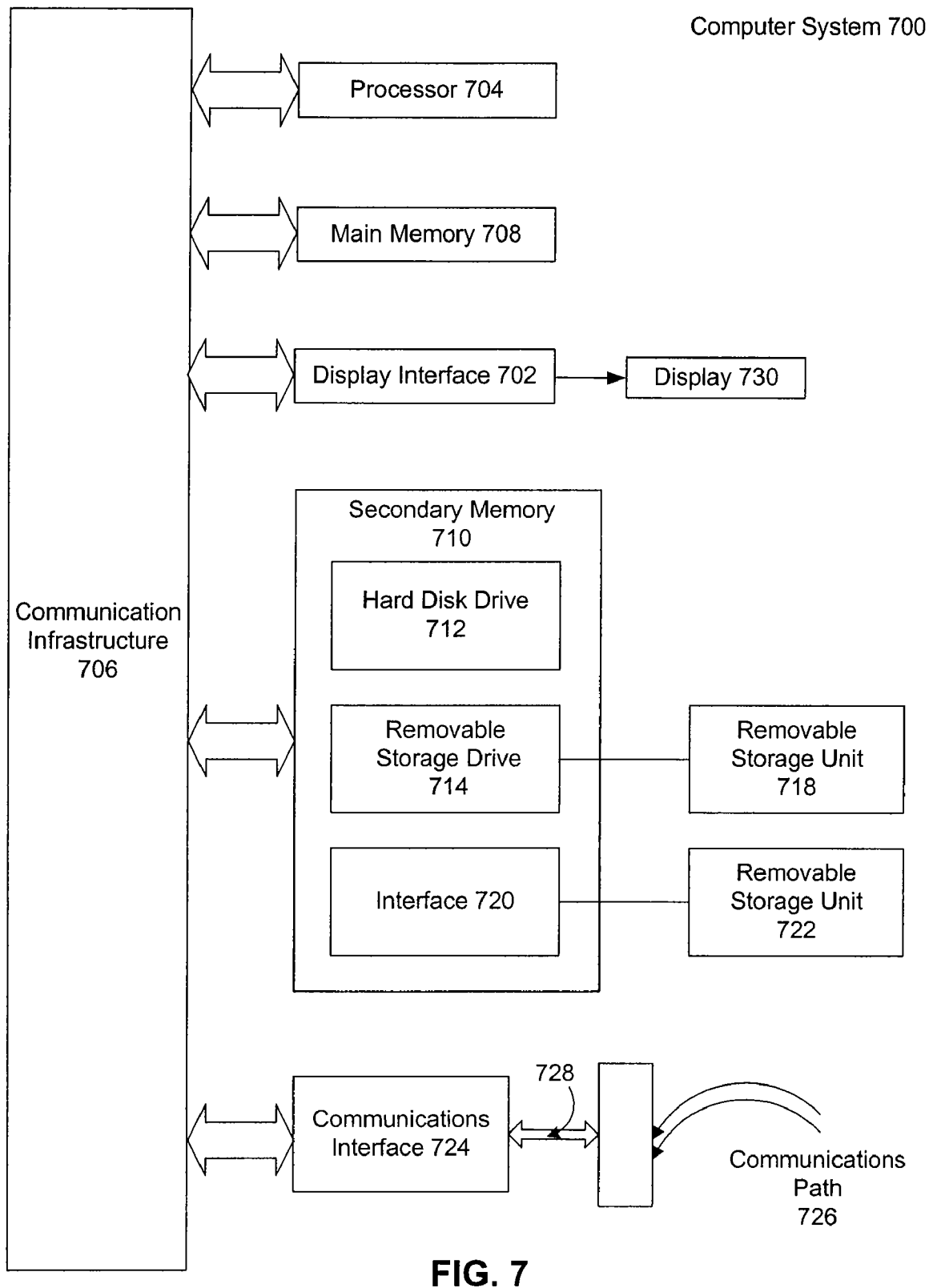
FIG. 7 is a block diagram of a computer system on which the present invention can be implemented.

FIG. 6 shows a further example of a linked card transaction using an FSA card that is linked to an FSA and to a transaction account. Specifically, FIG. 6 shows an example of a linked card transaction where the FSA is linked to a customer's regular transaction instrument, such as an American Express® card, a Visa® card, Discover® card, or the like.

An employee or customer with an FSA purchases both eligible and ineligible items. For example, the customer purchases prescription drugs (which are covered) and vitamins (which are not covered). At step 602, the customer presents his/her FSA card at the POS register for payment. The FSA card is swiped or otherwise registered with the system. At step 604, a determination is made whether the FSA card can be accepted for payment. If the card cannot be accepted, the transaction is declined at step 606. Steps 604 and 606 are accomplished by a Processor and a Card Platform, corresponding to Processor 502 and Card Platform 504. The process for authorizing or declining a card is the same as was described above with respect to FIG. 5. If the card is declined and the customer wishes to continue with the transaction, he/she must use an alternate source of funds (e.g., cash or another transaction instrument) at step 608 to pay for the items and complete the purchase.

At step 610, the customer must submit receipts for the FSA eligible items to a TPA, corresponding to TPA 508. A determination is made at step 612 by the TPA whether the customer has adequately substantiated the eligibility of the purchase. If the purchase is eligible for reimbursement, at step 614 the TPA issues a reimbursement from the customer's FSA. If the purchase is not deemed to be eligible, at step 616 the TPA informs the customer that substantiation of eligibility is insufficient and that the customer will not be reimbursed from the FSA.

Returning to step 604, if the FSA card is accepted, the transaction is completed at step 618 and the transaction data is sent to the TPA for processing. At step 620, the TPA charges the entire transaction to the customer's FSA card and the charge is settled to the customer's FSA. At step 622, the TPA then determines whether any part of the transaction requires substantiation. If substantiation is not required, for example, if the entire charge was placed by a certified medical service provider, such as a medical doctor, no further action is required. The spend is automatically adjudicated at step 624 and processed through the customer's FSA account.

If, at step 622, the TPA determines that substantiation of any charge in the transaction is necessary, then at step 626 the TPA notifies the customer of the need to provide substantiation within a specific time period. If the customer does not provide the required substantiation to support the eligibility of the charges, and if the customer does not have an FSA linked to the FSA card, the customer's FSA card may be deactivated at step 628 to prevent any further charges from being incurred on it. The TPA must then try to collect from the customer for the ineligible charges. This is the "pay and chase" scenario described above.

However, if the customer has an FSA linked card, the ineligible charges are then charged to the customer's linked transaction account at step 630.

In one embodiment, the invention is directed toward one or more computer systems capable of carrying out the functionality described herein. An example of a computer system 700 is shown in FIG. 9.

Computer system 700 includes one or more processors, such as processor 704. Processor 704 is connected to a communication infrastructure 706 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 700 can include a display interface 702 that forwards graphics, text, and other data from communication infrastructure 706 (or from a frame buffer not shown) for display on display unit 716.

Computer system 700 also includes a main memory 708, preferably random access memory (RAM), and may also include a secondary memory 710. Secondary memory 710 may include, for example, a hard disk drive 712 and/or a removable storage drive 714, representing a floppy disk drive, a magnetic tape drive, an optical disk drive, etc. Removable storage drive 714 reads from and/or writes to a removable storage unit 718 in a well known manner. Removable storage unit 718 represents a floppy disk, magnetic tape, optical disk, etc. which is read by and written to by removable storage drive 714. As will be appreciated, removable storage unit 718 includes a computer usable storage medium having stored therein computer software and/or data.

In alternative embodiments, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728 which may be electronic, electromagnetic, optical or other signals capable of being received by communications interface 724. These signals 728 are provided to communications interface 724 via a communications path (e.g., channel) 726. This channel 726 carries signals 728 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 714, a hard disk installed in hard disk drive 712, and signals 728. These computer program products provide software to computer system 700. The invention is directed to such computer program products.

Computer programs (also referred to as computer control logic) are stored in main memory 708 and/or secondary memory 710. Computer programs may also be received via communications interface 724. Such computer programs, when executed, enable computer system 700 to perform the features of the present invention, as discussed herein. In particular, the computer programs, when executed, enable processor 704 to perform the features of the present invention. Accordingly, such computer programs represent controllers of computer system 700.

In an embodiment where the invention is implemented using software, the software may be stored in a computer program product and loaded into computer system 700 using removable storage drive 714, hard drive 712 or communications interface 724. The control logic (software), when executed by processor 704, causes processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention (e.g., packaging and activation of other transaction cards and/or use of batch activation processes). Thus, the present invention should not be limited by any of the above described exemplary embodiments, but should be defined only in accordance with the following claims and their equivalents.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. The scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. An apparatus comprising:
   a processor; and
   a memory storing instructions, execution of which by a computing device causes the computing device to perform operations comprising:
   linking an existing card, associated with a non tax-advantaged account of a cardholder, to a Health Savings Account (HSA) of the cardholder;
   receiving a request, initiated by a use of the card, for payment authorization for a purchase of a plurality of items, at least one of which qualifies for pre-tax treatment and at least one other of which does not qualify for pre-tax treatment,
   authorizing payment for the purchase,
   transmitting a payment authorization to a point of sale device,
   causing the HSA to be debited for at least a first portion of a first purchase amount of the at least one item that qualifies for pre-tax treatment, and
   causing the non tax-advantaged account to be debited for at least a second portion of a second purchase amount of the at least one item that does not qualify for pre-tax treatment.

2. An apparatus comprising:
   means for linking an existing card, associated with a non tax-advantaged account of a cardholder, to a Health Savings Account (HSA) of the cardholder;
   means for receiving a request, initiated by a use of the card, for payment authorization for a purchase of one or more items;
   means for determining whether one or more of said items qualifies for pre-tax treatment;
   means for determining at least partial payment authorization for said qualifying item, transmitting said at least partial payment authorization for said qualifying item to a point of sale device, and causing the HSA to be debited for at least a portion of the purchasing amount of said qualifying item based on said payment authorization in response to a first determination that at least one of said items qualifies for pre-tax treatment; and
   means for causing the non tax-advantaged account to be debited for said non-qualifying item in response to a second determination that at least one of said items does not qualify for pre-tax treatment.

3. A method comprising:
   linking an existing card, associated with a non tax-advantaged account of a cardholder, to a Health Savings Account (HSA) of the cardholder;
   receiving, using a computing device, a request, initiated by a use of the card, for payment authorization for an item charge;
   determining, using the computing device, whether the item charge qualifies for pre-tax treatment;
   causing, using the computing device, the HSA to be debited for the item charge in response to a first determination that the item charge qualifies for pre-tax treatment; and
   causing, using the computing device, the non tax-advantaged account to be debited for the item charge in response to a second determination that the item charge does not qualify for pre-tax treatment.

4. The method according to claim 3, wherein the determining whether the item charge qualifies for pre-tax treatment comprises at least one of:
   determining whether the transaction instrument is associated with the HSA;
   determining whether the FSA contains sufficient funds to cover the item charge; or
   determining whether the merchant satisfies the requirements necessary to permit funds for the purchase to be drawn from the HSA.

5. The method according to claim 3, wherein the determining whether the item charge qualifies for pre-tax treatment comprises determining whether the item charge satisfies Internal Revenue Service Guidelines.

6. The method according to claim 5, wherein the item charge is associated with a plurality of items to be charged, and wherein the method further comprises:
   determining whether any of the plurality of items does not satisfy Internal Revenue Service Guidelines;
   separating out items that do not satisfy Internal Revenue Service Guidelines;
   causing the HSA to be debited for a charge of an item or items that satisfy Internal Revenue Service Guidelines; and causing the non tax-advantaged account to be debited for a charge of an item or items not satisfying Internal Revenue Service Guidelines.

7. The method according to claim 3, wherein the item charge is associated with a plurality of items to be charged, and wherein the method further comprises:
   determining whether any of the plurality of items to be charged is not eligible to be charged to the HSA;
   separating out items not eligible to be charged to the HSA;
   causing the HSA to be debited for a charge of an item or items eligible to be charged to the HSA; and
   causing the non tax-advantaged account to be debited for a charge of an item or items not eligible to be charged to the HSA.

8. The method of claim 3, wherein the card is a credit card.

9. The method of claim 8, wherein the card is owed by the cardholder prior to an opening of the HSA by the cardholder.

10. The method of claim 3, wherein the card is a debit card.

11. The method of claim 3, wherein linking the card to the HSA enables usage of the card for HSA expenses, thereby creating a virtual HSA within the non tax- advantaged account.

12. The method of claim 11, further comprising linking functionality associated with the HSA to the non tax-advantaged account.

13. The method of claim 3, wherein the transaction instrument is at least one of:
   an open or closed charge card,
   a stored value card, or
   an RFID chip based card or token.

14. The method of claim 3, wherein causing the HSA to be debited further comprises submitting a receipt for the item charge to a third party administrator in response to a third determination that the item charge qualifies for pre-tax treatment, wherein the third party administrator charges the item charge to the HSA, and wherein the third party administrator determines whether substantiation of a portion of the item charge is necessary.

15. The method of claim 14, wherein the third party administrator notifies the cardholder and charges the non tax-advantaged account in response to a determination that substantiation of the portion of the item charge is necessary.

16. An article of manufacture including a computer-readable medium having instructions stored thereon, an execution of which by a computing device causes the computing device to perform operations comprising:
   linking an existing card, associated with a non-tax advantaged account of a cardholder, to a Health Savings Account (HSA) of the cardholder;
   receiving, using the computing device, a request, initiated by a use of the card, for payment authorization for an item charge;
   determining, using the computing device, whether the item charge qualifies for pre-tax treatment;
   causing, using the computing device, the HSA to be debited for the item charge in response to a first determination that the item charge qualifies for pre-tax treatment; and
   causing, using the computing device, the non-tax advantaged account to be debited for the item charge in response to a second determination that the item charge does not qualify for pre-tax treatment.

17. The article of manufacture according to claim 16, wherein the determining whether the item charge qualifies for pre-tax treatment comprises at least one of:
   determining whether the transaction instrument is associated with the HSA;
   determining whether the HSA contains sufficient funds to cover the charge for the purchase; and
   determining whether the merchant satisfies the requirements necessary to permit funds for the purchase to be drawn from the HSA.

18. The article of manufacture according to claim 16, wherein the determining whether the item charge qualifies for pre-tax treatment comprises:
   determining whether the item charge satisfies Internal Revenue Service Guidelines.

19. The article of manufacture according to claim 18, wherein the item charge comprises a plurality of items to be charged, and wherein the operations further comprise:
   determining whether any of the plurality of items does not satisfy Internal Revenue Service Guidelines;
   separating out items that do not satisfy Internal Revenue Service Guidelines;
   causing the HSA to be debited for a charge of an item or items that satisfy Internal Revenue Service Guidelines; and
   causing the non tax-advantaged account to be debited for charge of the item or items that do not satisfy Internal Revenue Service Guidelines.

20. The article of manufacture according to claim 16, wherein the item charge is associated with a plurality of items to be charged, and wherein the operations further comprise:
   whether any of the plurality of items to be charged is not eligible to be charged to the HSA;
   separating out items that are not eligible to be charged to the HSA;
   causing the HSA to be debited for a charge of an item or items that are eligible to be charged to the HSA; and
   causing the non tax-advantaged account to be debited for a charge of an item or items that are not eligible to be charged to the HSA.

* * * * *

UNITED STATES PATENT AND TRADEMARK OFFICE
CERTIFICATE OF CORRECTION

PATENT NO. : 7,905,399 B2  Page 1 of 1
APPLICATION NO. : 11/381641
DATED : March 15, 2011
INVENTOR(S) : Barnes et al.

It is certified that error appears in the above-identified patent and that said Letters Patent is hereby corrected as shown below:

Title page, item (76), under "Inventors", in Column 1, Line 2, delete "Michael" and insert -- Michal --.

Column 24, line 49, in Claim 4, delete "FSA" and insert -- HSA --.

Column 25, line 21, in Claim 11, delete "tax- advantaged" and insert -- tax-advantaged --.

Column 25, lines 47-48, in Claim 16, delete "non-tax advantaged" and insert -- non tax-advantaged --.

Column 26, lines 7-8, in Claim 16, delete "non-tax advantaged" and insert -- non tax-advantaged --.

Column 26, line 42, in Claim 20, delete "whether" and insert -- determining whether --.

Signed and Sealed this
Nineteenth Day of July, 2011

David J. Kappos
*Director of the United States Patent and Trademark Office*